(12) United States Patent
Jones et al.

(10) Patent No.: US 10,818,088 B2
(45) Date of Patent: *Oct. 27, 2020

(54) VIRTUAL BARRIER OBJECTS

(71) Applicant: Curious Company, LLC, Portland, OR (US)

(72) Inventors: Anthony Mark Jones, Hillsboro, OR (US); Jessica A. F. Jones, Forest Grove, OR (US); Bruce A. Young, Le Mars, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/031,772

(22) Filed: Jul. 10, 2018

(65) Prior Publication Data

US 2020/0020161 A1    Jan. 16, 2020

(51) Int. Cl.
*G06T 19/00* (2011.01)
*G06T 15/00* (2011.01)

(52) U.S. Cl.
CPC .......... *G06T 19/006* (2013.01); *G06T 15/005* (2013.01); *G06T 2200/04* (2013.01); *G06T 2200/24* (2013.01)

(58) Field of Classification Search
CPC .................................................. G06T 19/006
USPC ....................................................... 345/419
See application file for complete search history.

(56) References Cited

U.S. PATENT DOCUMENTS

| | | | |
|---|---|---|---|
| 3,861,350 A | 1/1975 | Selleck | |
| 5,309,169 A * | 5/1994 | Lippert | G02B 27/0172 345/7 |
| 5,815,411 A * | 9/1998 | Ellenby | G01C 17/34 702/150 |
| 8,520,900 B2 | 8/2013 | Rhoads et al. | |
| 8,863,039 B2 | 10/2014 | Lim et al. | |
| 8,953,841 B1 * | 2/2015 | Leblang | G06K 9/00671 345/633 |
| 9,165,381 B2 | 10/2015 | Latta et al. | |
| 9,229,231 B2 | 1/2016 | Small et al. | |
| 9,292,096 B2 | 3/2016 | Watanabe et al. | |
| 9,852,599 B1 | 12/2017 | Slavin et al. | |

(Continued)

FOREIGN PATENT DOCUMENTS

| | | |
|---|---|---|
| CN | 103697900 A | 4/2014 |
| CN | 105781618 A | 7/2016 |

(Continued)

OTHER PUBLICATIONS

"Obstacle Detection as a Safety Alert in Augmented Reality Models by the Use of Deep Learning Techniques", Potap et al., Sensors (Basel). Dec. 4, 2017.*

(Continued)

*Primary Examiner* — Javid A Amini
(74) *Attorney, Agent, or Firm* — Young's Patent Service; Bruce A. Young

(57) ABSTRACT

A computer system presents a virtual object on a display of the computer system which represents an action at a location in space. If a user of the computer system approaches the location, the computer system presents one or more stimuli to encourage movement away from that location. The appearance of the object may vary as the user of the computer system moves. The appearance of the object may include information and may vary with a change of state. Multiple such virtual objects may be used to indicate a path.

15 Claims, 14 Drawing Sheets

(56) References Cited

U.S. PATENT DOCUMENTS

| | | | |
|---|---|---|---|
| 9,911,020 B1 | 3/2018 | Liu et al. | |
| 9,928,662 B2 | 3/2018 | Palmaro | |
| 9,953,216 B2 | 4/2018 | Alvarez | |
| 9,978,180 B2 | 5/2018 | Margolis et al. | |
| 10,065,074 B1 | 9/2018 | Hoang et al. | |
| 10,134,192 B2 | 11/2018 | Tomlin et al. | |
| 10,203,762 B2 | 2/2019 | Bradski et al. | |
| 10,430,985 B2 | 10/2019 | Harrises et al. | |
| 10,497,161 B1 | 12/2019 | Jones et al. | |
| 10,528,228 B2 | 1/2020 | Seixeiro et al. | |
| 10,636,197 B2 | 4/2020 | Jones | |
| 10,636,216 B2 | 4/2020 | Jones et al. | |
| 10,650,600 B2 | 5/2020 | Jones et al. | |
| 10,706,629 B2 | 7/2020 | Boyapalle et al. | |
| 2002/0191004 A1 | 12/2002 | Ebersole | |
| 2002/0196202 A1 | 12/2002 | Bastian et al. | |
| 2003/0025714 A1* | 2/2003 | Ebersole | G06F 3/011 345/632 |
| 2003/0210812 A1 | 11/2003 | Khamene et al. | |
| 2005/0041424 A1 | 2/2005 | Ducharme | |
| 2007/0045641 A1 | 3/2007 | Chua et al. | |
| 2008/0267490 A1 | 10/2008 | Gorges et al. | |
| 2008/0300854 A1 | 12/2008 | Eibye | |
| 2009/0065715 A1 | 3/2009 | Wainright | |
| 2009/0091237 A1 | 4/2009 | Hirosaki et al. | |
| 2009/0109244 A1 | 4/2009 | Conner et al. | |
| 2009/0240431 A1 | 9/2009 | Chau et al. | |
| 2009/0251537 A1 | 10/2009 | Keidar et al. | |
| 2010/0117828 A1 | 5/2010 | Goldman et al. | |
| 2010/0302015 A1 | 12/2010 | Kipman et al. | |
| 2011/0270135 A1 | 11/2011 | Dooley et al. | |
| 2012/0087104 A1 | 4/2012 | Dai et al. | |
| 2012/0105473 A1 | 5/2012 | Bar-Zeev et al. | |
| 2012/0249741 A1 | 10/2012 | Maciocci et al. | |
| 2012/0289290 A1 | 11/2012 | Chae et al. | |
| 2013/0073637 A1 | 3/2013 | Kim | |
| 2013/0222371 A1 | 8/2013 | Reitan | |
| 2013/0249947 A1 | 9/2013 | Reitan | |
| 2013/0249948 A1 | 9/2013 | Reitan | |
| 2013/0342564 A1 | 12/2013 | Kinnebrew et al. | |
| 2014/0002444 A1 | 1/2014 | Bennett et al. | |
| 2014/0306891 A1* | 10/2014 | Latta | G06F 3/017 345/158 |
| 2015/0109193 A1 | 4/2015 | Sly et al. | |
| 2015/0130790 A1 | 5/2015 | Vasquez et al. | |
| 2015/0243079 A1 | 8/2015 | Cho et al. | |
| 2015/0263806 A1 | 9/2015 | Puscasu et al. | |
| 2015/0293592 A1 | 10/2015 | Cheong et al. | |
| 2015/0325047 A1 | 11/2015 | Conner et al. | |
| 2016/0003737 A1 | 1/2016 | Shimada | |
| 2016/0026253 A1 | 1/2016 | Bradski et al. | |
| 2016/0147408 A1 | 5/2016 | Bevis et al. | |
| 2016/0187974 A1 | 6/2016 | Mallinson | |
| 2016/0248506 A1 | 8/2016 | Ryan et al. | |
| 2016/0270656 A1 | 9/2016 | Samec et al. | |
| 2016/0342388 A1 | 11/2016 | Imamura et al. | |
| 2017/0005826 A1 | 1/2017 | Youn | |
| 2017/0026560 A1 | 1/2017 | Whitehouse et al. | |
| 2017/0061696 A1 | 3/2017 | Li et al. | |
| 2017/0091998 A1 | 3/2017 | Piccolo | |
| 2017/0103440 A1 | 4/2017 | Xing et al. | |
| 2017/0117823 A1 | 4/2017 | Arnaud et al. | |
| 2017/0169170 A1 | 6/2017 | Otin | |
| 2017/0173457 A1 | 6/2017 | Rihn | |
| 2017/0192091 A1 | 7/2017 | Felix | |
| 2017/0193705 A1 | 7/2017 | Mullins et al. | |
| 2017/0269712 A1 | 9/2017 | Forsblom et al. | |
| 2017/0277166 A1 | 9/2017 | Popa-Simil et al. | |
| 2017/0277257 A1 | 9/2017 | Ota et al. | |
| 2017/0301107 A1 | 10/2017 | Sasaki | |
| 2017/0330042 A1 | 11/2017 | Vaziri | |
| 2017/0330376 A1 | 11/2017 | Haseltine et al. | |
| 2017/0341576 A1 | 11/2017 | Lei et al. | |
| 2017/0354878 A1 | 12/2017 | Posin | |
| 2017/0374486 A1 | 12/2017 | Killham et al. | |
| 2018/0011676 A1 | 1/2018 | Han et al. | |
| 2018/0029641 A1* | 2/2018 | Solar | B62D 15/0275 |
| 2018/0050267 A1 | 2/2018 | Jones | |
| 2018/0053394 A1 | 2/2018 | Gersten | |
| 2018/0074599 A1 | 3/2018 | Garcia et al. | |
| 2018/0107277 A1* | 4/2018 | Keller | G06F 3/014 |
| 2018/0120936 A1* | 5/2018 | Keller | G06F 3/147 |
| 2018/0239144 A1 | 8/2018 | Woods et al. | |
| 2018/0239417 A1 | 8/2018 | Fu et al. | |
| 2018/0246698 A1 | 8/2018 | Huang | |
| 2018/0261012 A1* | 9/2018 | Mullins | H04L 67/22 |
| 2018/0262270 A1 | 9/2018 | Maricic et al. | |
| 2018/0299272 A1 | 10/2018 | Salowitz | |
| 2018/0299543 A1 | 10/2018 | Lomnitz et al. | |
| 2018/0303190 A1 | 10/2018 | Calilung et al. | |
| 2018/0307310 A1 | 10/2018 | Mccombe et al. | |
| 2018/0350221 A1 | 12/2018 | Chabra et al. | |
| 2019/0007548 A1 | 1/2019 | Sit et al. | |
| 2019/0011703 A1 | 1/2019 | Robaina et al. | |
| 2019/0026592 A1 | 1/2019 | Wang et al. | |
| 2019/0101978 A1* | 4/2019 | Iseringhausen | G06F 3/013 |
| 2019/0113207 A1 | 4/2019 | Palmer et al. | |
| 2019/0114921 A1 | 4/2019 | Cazzoli | |
| 2019/0116448 A1 | 4/2019 | Schmidt et al. | |
| 2019/0132815 A1 | 5/2019 | Zampini et al. | |
| 2019/0196578 A1 | 6/2019 | Iodice et al. | |
| 2019/0199136 A1 | 6/2019 | Choi et al. | |
| 2019/0271755 A1 | 9/2019 | Peitz et al. | |
| 2019/0373395 A1 | 12/2019 | Sarkar | |
| 2019/0377538 A1 | 12/2019 | Jones et al. | |
| 2019/0385370 A1 | 12/2019 | Boyapalle et al. | |
| 2020/0020145 A1 | 1/2020 | Jones et al. | |
| 2020/0020162 A1 | 1/2020 | Jones et al. | |
| 2020/0082600 A1 | 3/2020 | Jones et al. | |
| 2020/0082601 A1 | 3/2020 | Jones et al. | |
| 2020/0082602 A1 | 3/2020 | Jones | |
| 2020/0082628 A1 | 3/2020 | Jones et al. | |
| 2020/0150751 A1 | 5/2020 | Laaksonen et al. | |
| 2020/0018363 A1 | 6/2020 | Boyapalle et al. | |
| 2020/0183171 A1 | 6/2020 | Robaina et al. | |

FOREIGN PATENT DOCUMENTS

| | | |
|---|---|---|
| CN | 107657662 A | 2/2018 |
| WO | 2003060830 A1 | 7/2003 |
| WO | 2017151778 A1 | 9/2017 |

OTHER PUBLICATIONS

DAQRI, Smart Glasses Specifications Sheet, Retrieved from https://assets.daqri.com/documents/DAQRI_Smart_Glasses_Datasheet_2018.pdf on Jun. 20, 2018.

DAQRI, Smart Glasses, Retrieved from https://www.daqri.com/products/smart-glasses/ on Jun. 20, 2018.

Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.

Osterhout Design Group, Smartglasses 7, Retrieved from http://www.osterhoutgroup.com/downloads/pdf/product/R-7HL-TechSheet.pdf on Jun. 20, 2018.

Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun 20, 2018.

Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013g1l63cseeyjw2I1fob4gx02f on Jun. 20, 2018.

Unpublished U.S. Appl. No. 16/031,797, filed Jul. 10, 2018.

Bjerregaard, Lindsay, Consilio3D Technologies Creates New Augmented Reality Inspection Product, Retrieved from http://www.mro-network.com/software/consilio3d-technologies-creates-new-augmented-reality-inspection-product on Jun. 20, 2018.

DAQRI, Smart Glasses Specifications Sheet, Mar. 15, 2018, Retrieved from https://assets.daqri.com/documents/DAQRI_Smart_Glasses_Datasheet_2018.pdf on Aug. 22, 2019.

(56) References Cited

OTHER PUBLICATIONS

Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.
Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.
Laster Technologies, Laster SeeThru: The First Genuine Augmented Reality Wireless Eyewear Launches on Kickstarter, Retrieved from https://www.businesswire.com/news/home/20140115005387/en/LASTER-SeeThru-Genuine-Augmented-Reality-Wireless-Eyewear on Jun. 20, 2018.
Microsoft, Hololens Overview, Retrieved from https://www.microsoft.com/en-us/hololens/commercial-overview on Jun. 20, 2018.
Microsoft, Why Hololens, Retrieved from https://www.microsoft.com/en-us/hololens/why-hololens on Jun. 20, 2018.
Occulus, Rift VR Headset, Retrieved from https://www.oculus.com/rift/?utm_campaign=%5bcampaign%5d&utm_source=google&utm_medium=cpc&gclid=Cj0KCQiAzrTUBRCnARIsAL0mqcyb5Mhp YgdQ1fl2hb0CxWclg32N-e8B4Vv-zBcirW136-5JU3PAQaEaAkLaEALw_wcB&gclsrc=aw.ds on Jun. 20, 2018.
Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 22, 2018.
Upskill, Comm industrial equipment manufacturing use cases, Retrieved from https://upskill.io/skylight/industries/industrial-equipment/ on Jun. 20, 2018.
Upskill, Getting the Torque Just Right with Skylight Could Save Millions, Retrieved from https://upskill.io/landing/ge-aviation-case-study/ on Jun. 20, 2018.
USPTO, Final Office Action in Related Matter U.S. Appl. No. 16/007,204, dated May 17, 2019.
USPTO, Non-Final Office Action in Related Matter U.S. Appl. No. 16/007,204, dated Dec. 10, 2018.
VIVE, HTC VIVE PRO, Retrieved from https://www.vive.com/us/vive-pro-vr/?gclid=CjwKCAjwlcXXBRBhEiwApfHGTZTvHlnsm DrpO7DC7pDJaBzlpsbG7a-U2iWrGgBpoiwc07DoRYThaxoCLVMQAvD_BwE on Jun. 20, 2018.
Xiang et al., Object Detection by 3D Aspectlets and Occlusion Reasoning, 4th International IEEE Workshop on 3D Representation and Recognition (3dRR), 2013.
Young, Bruce, Response to Final Office Action in Related Matter U.S. Appl. No. 16/007,204, dated Jul. 17, 2019.
Young, Bruce, Response to Non-Final Office Action in Related Matter U.S. Appl. No. 16/007,204, dated Mar. 11, 2019.
USPTO, Non-Final Office Action in Related Matter U.S. Appl. No. 16/135,214, dated Dec. 19, 2019.
Young, Bruce, Response to non-Final Office Action in Related Matter U.S. Appl. No. 16/007,335, dated Jan. 2, 2020.
Young, Bruce, Response to non-Final Office Action in Related Matter U.S. Appl. No. 16/0331,797, dated Jan. 6, 2020.
Young, Bruce, Response to non-Final Office Action in Related Matter U.S. Appl. No. 16/123,543, dated Jan. 3, 2020.
Young, Bruce, Response to non-Final Office Action in Related Matter U.S. Appl. No. 16/135,119, dated Jan. 6, 2020.
Young, Bruce, Response to non-Final Office Action in Related Matter U.S. Appl. No. 16/135,175, dated Jan. 6, 2020.
Young, Bruce, Response to non-Final Office Action in Related Matter U.S. Appl. No. 16/135,198, dated Jan. 9, 2020.
Young, Bruce, Response to non-Final Office Action in Related Matter U.S. Appl. No. 16/135,214, dated Jan. 9, 2020.
USPTO, Non-Final Office Action in Related Matter U.S. Appl. No. 16/135,175, dated Oct. 23, 2019.
USPTO, Non-Final Office Action in Related Matter U.S. Appl. No. 16/135,198, dated Nov. 20, 2019.
USPTO, Non-Final Office Action in Related Matter U.S. Appl. No. 16/007,335, dated Sep. 6, 2019.
USPTO, Non-Final Office Action in Related Matter U.S. Appl. No. 16/031,797, dated Oct. 9, 2019.
USPTO, Non-Final Office Action in Related Matter U.S. Appl. No. 16/123,543, dated Oct. 9, 2019.
USPTO, Non-Final Office Action in Related Matter U.S. Appl. No. 16/135,119, dated Oct. 17, 2019.
USPTO, Notice of Allowance for U.S. Appl. No. 16/0007,204, dated Sep. 6, 2018.
Fink, AR Gesture Control Arrives, Consumer Tech, Sep. 8, 2017, pp. 1-5.
Kilkmeier, et al., With a Little Help from a Holographic Friend: The OpenIMPRESS Mixed Reality Telepresence Toolkit for Remote Collaboration Systems, Proceedings of the 24th ACM Symposium on Virtual Reality Software and Technology, Nov. 28, 2018, pp. 1-11.
Kim, et al., Real-Time Human Pose Estimation and Gesture Recognition from Depth Images Using Superpixels and SVM Classifier, Sensors, Jun. 2015, (6):12410-27.
Le Chenechal, et al. Vishnu: Virtual Immersive Support for HelpiNg Users, 2016 IEEE Third VR International Workshop on Collaborative Virtual Environments (3DCVE), Mar. 20, 2016 (p. 9-12) IEEE.
Palladino, Disney Research Creates Avatars That Can Strike a Pose to Match a Person's Movements in Augmented Reality, Jul. 23, 2018 https://next.reality.news/news/disney-research-creates-avatars-can-strike-pose-match-persons-movements-augmented-reality-0186149/.
Pandey, et al., Real-Time Egocentric Gesture Recognition on Mobile Head Mounted Displays, arXiv preprint arXiv:1712:04961, Dec. 13, 2017.
Piumsomboon, et al., Exploring Enhancements for Remote Mixed Reality Collaboration, Siggragh Asia 2017 Mobile Graphics & Interactive Applications, 22/27/2017, pp. 1-5.
Piumsomboon, et al., Mini-Me An Adaptive Avatar for Mixed Reality Remote Collaboration, CHI 2018, Feb. 21, 2018.
USPTO, Final Office Action in related case U.S. Appl. No. 16/135,175, dated Jan. 27, 2019.
USPTO, Final Office Action in Related Matter U.S. Appl. No. 16/135,198, dated Jan. 29, 2020.
USPTO, Final Office Action in Related Matter U.S. Appl. No. 16/007,335, dated Apr. 28, 2020.
USPTO, Final Office Action in Related Matter U.S. Appl. No. 16/123,543, dated Jan. 16, 2020.
USPTO, Final Office Action in Related Matter U.S. Appl. No. 16/135,119, dated Jan. 24, 2020.
USPTO, Non-Final Office Action in Related Matter U.S. Appl. No. 116/358,482, dated Apr. 9, 2020.
USPTO, Non-Final Office Action in Related Matter U.S. Appl. No. 16/230,278, dated Feb. 21, 2020.
USPTO, Non-Final Office Action in Related Matter U.S. Appl. No. 16/353,495, dated Apr. 9, 2020.
USPTO, Non-Final Office Action in Related Matter U.S. Appl. No. 16/353,847, dated Feb. 7, 2020.
USPTO, Non-Final Office Action in Related Matter U.S. Appl. No. 16/208,799, dated Feb. 26, 2020.
USPTO, Non-Final Office Action in Related Matter U.S. Appl. No. 16/211,061, dated Feb. 27, 2020.
USPTO, Non-Final Office Action in Related Matter U.S. Appl. No. 16/353,885, dated Mar. 18, 2020.
USPTO, Notice of Allowance in Related Matter U.S. Appl. No. 16/031,797, dated Feb. 21, 2020.
USPTO, Notice of Allowance in Related Matter U.S. Appl. No. 16/135,119, dated Feb. 10, 2020.
USPTO, Notice of Allowance in Related Matter U.S. Appl. No. 16/135,214, dated Feb. 7, 2020.
Young, Bruce, Response to Final Office Action in Related Matter U.S. Appl. No. 16/123,543 dated May 18, 2020.
Young, Bruce, Response to Final Office Action in Related Matter U.S. Appl. No. 16/135,119, dated Jan. 31, 2020.
Young, Bruce, Response to Final Office Action in Related Matter U.S. Appl. No. 16/135,198, dated May 29, 2020.
Young, Bruce, Response to Non-Final Office Action in Related Matter U.S. Appl. No. 15/353,847, dated May 7, 2020.

(56) References Cited

OTHER PUBLICATIONS

Young, Bruce, Response to Non-Final Office Action in Related Matter U.S. Appl. No. 16/208,799, dated May 26, 2020.
Elliott LR, Hill SG, Barnes M. Gesture-based controls for robots: oveniew and implications for use by Soldiers. US Army Research Laboratory Aberdeen Proving Ground United States; Jul. 1, 2016.
Hardesty, Larry, MIT News, Guiding robot planes with hand gestures, Mar. 14, 2012, Retrieved from http://news.mit/edu/2012/robots-hand-gestures-0314 on Jul. 21, 2020.
USPTO, Final Office Action in Related Matter U.S. Appl. No. 16/208,799, dated Jul. 14, 2020.
USPTO, Final Office Action in Related Matter U.S. Appl. No. 16/211,061, dated Jul. 23, 2020.
Young, Bruce, Supplemental Response in Related Matter U.S. Appl. No. 16/358,495, dated Aug. 26, 2020.
Young, Bruce, Supplemental Amendment in Related Matter U.S. Appl. No. 16/358,482, dated Aug. 28, 2020.
Young, Bruce, Response to Final Office Action in Related Matter U.S. Appl. No. 16/007,335, dated Jul. 28, 2020.
Young, Bruce, Response to Final Office Action in Related Matter U.S. Appl. No. 16/211,061, dated Jun. 26, 2020.
Young, Bruce, Response to non-Final Office Action in Related Matter U.S. Appl. No. 16/123,543, dated Jul. 25, 2020.
Young, Bruce, Response to non-Final Office Action in Related Matter U.S. Appl. No. 16/135,175, dated Jun. 26, 2020.
USPTO, Final Office Action in Related Matter U.S. Appl. No. 16/353,885, dated Sep. 10, 2020.
Young, Bruce, Response to Non-Final Office Action in Related Matter U.S. Appl. No. 16/358,482, dated Aug. 10, 2020.
Young, Bruce, Response to Non-Final Office Action in Related Matter U.S. Appl. No. 16/358,495, dated Aug. 5, 2020.
Young, Bruce, Response to Non-Final Office Action in Related Matter U.S. Appl. No. 16/353,885 dated Jun. 18, 2020.

* cited by examiner

VIRTUAL BARRIER OBJECTS

CROSS-REFERENCE TO RELATED APPLICATIONS

This application is related to U.S. patent application Ser. No. 16/031,797, entitled Virtual Path Display, filed same day herewith, the contents of which are incorporated by reference herein for any and all purposes.

BACKGROUND

Technical Field

The present subject matter relates to displaying information, and more specifically, to presenting virtual barriers or virtual paths added to a real-world scene.

Background Art

Many situations require the presentation information to a user in a way that the user can receive the information when it is needed and ensures that the user acts accordingly. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

One new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
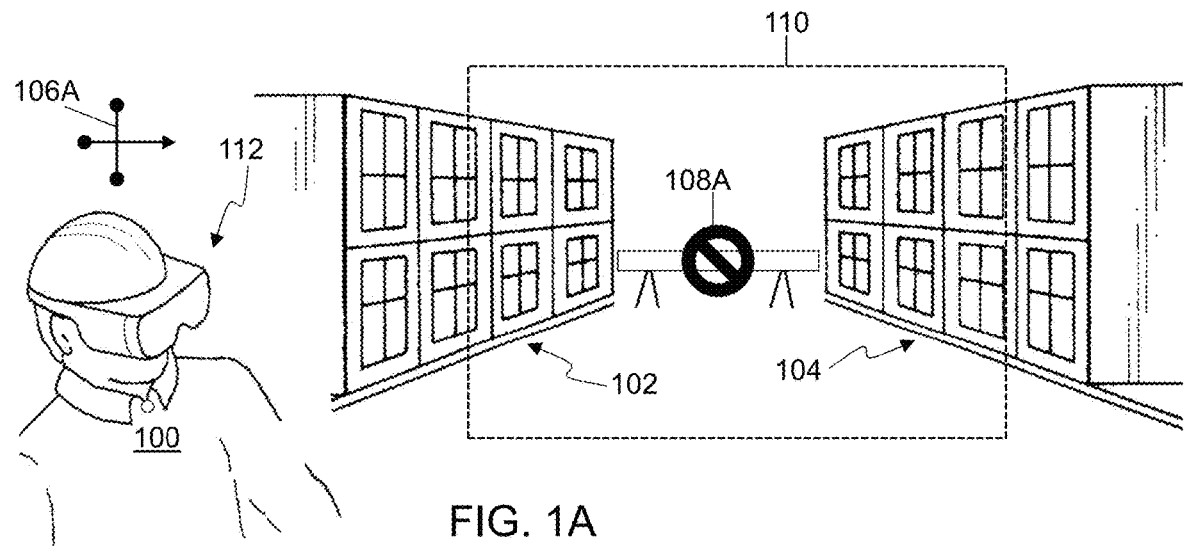
FIG. 1A shows a user wearing an embodiment of a head-mounted display presenting a virtual barrier.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid Reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude", "transparency", "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two-speaker system but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WiFi time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

Turning now to the current disclosure, systems that display HR imagery are becoming increasingly common and are making their way from entertainment and gaming into industrial and commercial applications. Examples of systems that may find HR imagery useful include aiding a person doing a task, for example repairing machinery, testing a system, or responding to an emergency.

Many of the same environments where HR imagery might be used also provide information to a user. This information may be associated with real objects in the environment or may be related to the environment as a whole, for example an ambient or average value. In other cases, the information to be provided to the user is unrelated to the real environment they are working in. Providing the various types of information to the user in a way that can be readily understood by the user and is not confusing, distracting or obscuring details that the user needs can be a challenge.

In an HR system which aids a person doing a task, for example repairing machinery, testing a system, or responding to an emergency, there may be areas of the environment that should not be entered because of potential danger, for example exposure to toxins, possible electrical shock, an unbreathable atmosphere, or a potentially unstable platform. In another example, there may objects in the environment that should be avoided, for example a critical component that cannot be repaired if broken, a sensitive detector that cannot be touched, or a device that may require a time-consuming and complex reconfiguration if knocked.

The virtual barrier is an artificial object that is created as an overlay on the screen used to indicate a barrier, for example to provide information that may be occluded or recommend that the user's movements be restricted. To simulate a physical object, in some embodiments the HR system may use additional stimuli to reinforce the virtual barrier, for example sounds, haptic pushes and changes to the display. As one non-limiting example, an buzzing sound may increase in volume or frequency to indicate potential encroachment as a user approaches a virtual barrier.

It is contemplated that a virtual barrier may be rendered in any manner, such as, but not limited to, a wall, a fence, a pole, an icon, or a cross. In some embodiments, a blanket color covering the component may be used to indicate that the component should be avoided. In some embodiments, additional graphics (e.g. icons or text) may be presented to provide further information.

In some embodiments, the position and orientation of a virtual barrier may be fixed in 3D space. If there is relative motion as described previously herein, a virtual barrier may appear as a static object in the environment by updating the overlay to show a virtual barrier in the same position and orientation in 3D space.

In some embodiments, a virtual barrier may also change appearance, such as, but not limited to, growing larger, changing color, or rendering a different image, to indicate a change in status.

In some embodiments, if a virtual barrier is about to be crossed, the stimuli may be changed, increased in volume, or updated more frequently rate to encourage the user to move a hand or to move away. In one example embodiment, when a virtual barrier is being approached, a directional haptic shake in the HR system, glove or suit may be used to prompt the user to move in a specific direction. In another example embodiment, a surprising flash on the display may also be used to indicate that a virtual barrier is being crossed, causing the user to stop and reassess. Sounds that have a position in space may be presented to encourage the user to move in a specific direction, for example away from a virtual barrier. In some embodiments, the user may move away from a strident alarm or move towards a sound that is associated with continuing the task at hand.

In some embodiments, the stimuli may include unexpected or unpleasant odors added to a breathing system, the temperature of a suit raised, or moisture added, to make the user more uncomfortable and so treat a virtual barrier as something to be avoided.

If a user moves away from a virtual barrier, it is contemplated that the virtual barrier may reinforce the user's action, such as, but not limited to, flashing, offering a reassuring voice or sound, or reducing any applied discomfort.

In some embodiments, a virtual barrier may also be used to direct the user of an HR system to controlled actions, such as, but not limited to, a next task, a specific location, a specific orientation, a specific height, a head turn, a body rotation, a hand re-position, or a hand gesture. Time-varying stimuli may be used to indicate a pattern of motions to aid user comprehension of the desired action. A virtual barrier may indicate a direction using stimuli that have a spatial position, for example a haptic pattern on one side of a suit, glove or head-mounted system, or a sound that has a simulated 3D position. A virtual barrier may change the display to include directional attributes, for example shaking the display in a preferred direction or adding arrows. In an example embodiment, a gradient is added to the display to indicate direction. The gradient may be any visual effect that has a direction, such as, but not limited to, brightness, distortion, or time-based flashes of out-of-view objects on one side of the display. For example, if the action is to move left, the right side of the display may be dimmed out and the left side of the display enhanced by brightening.

A plurality of virtual barriers may also be used to provide and enhance a specific path, for example a safe exit route in a smoke-filled building, or to a required position and orientation with respect to a physical object. In one embodiment, a path is defined by a sequence of virtual barriers placed in correct relative position and orientation of the screen; note that in any situation, only a portion of a virtual barrier sequence may be in effect or in view.

FIG. 1A shows how one embodiment of an HR system shows a virtual barrier 108A correctly positioned between walls 102, 104. The orientation of the user 100 in space is indicated by compass 106A. The field of view (FOV) of user 100 is indicated by the dotted box 110; note that box 110 and virtual barrier 108A are not in the real environment. The image of virtual barrier 108A is rendered on the head-mounted display 112 in the correct orientation of the user 100 according to the world-position of the gap between walls 102, 104.

Figure 1B:
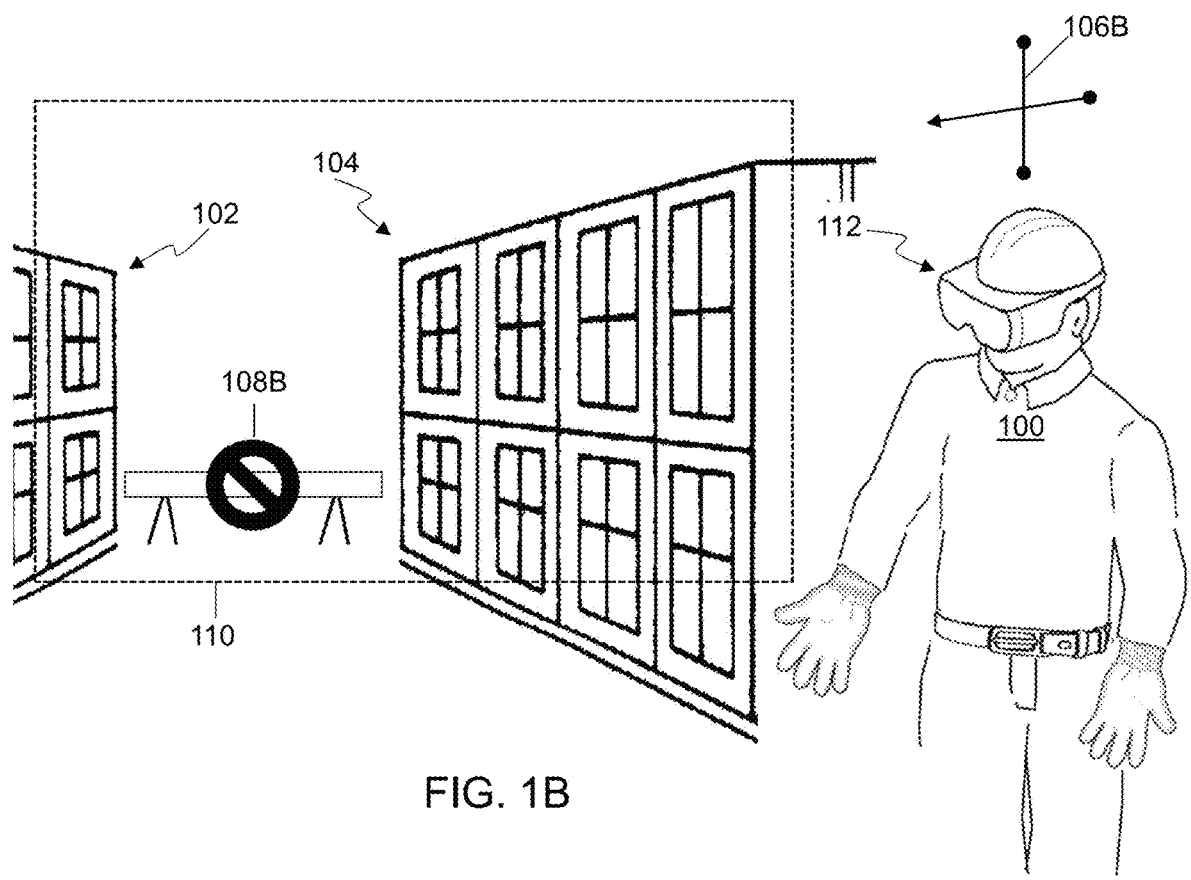
FIG. 1B shows a user wearing the embodiment of a head-mounted display presenting the virtual barrier from a different perspective.

FIG. 1B shows the user 100 in a new position and orientation as indicated by the compass 106B. At the time shown in FIG. 1B, user 100 is still looking at the gap between walls 102, 104. Similar to the vignette shown in FIG. 1A, a virtual barrier 108B is rendered on the head-mounted display 112 in the gap between walls 102, 104, but correctly rendered according to the new position and orientation of user 100. The rendering of virtual barrier 108A, 108B at the times of FIG. 1A and FIG. 1B reinforce the appearance of a fixed solid object in real 3D space on display 112.

It should be noted that the walls 102, 104 and other real-world objects are also visible to the user 100 in their FOV. Depending on the technology used, the user 100 may view the walls 102, 104 through a transparent portion of the display 112, such as in an AR HMD, or an image of the walls 102, 104 may be presented in the display 112 with the virtual barrier 108A, 108B, such as in a VR HMD.

Figure 2A:
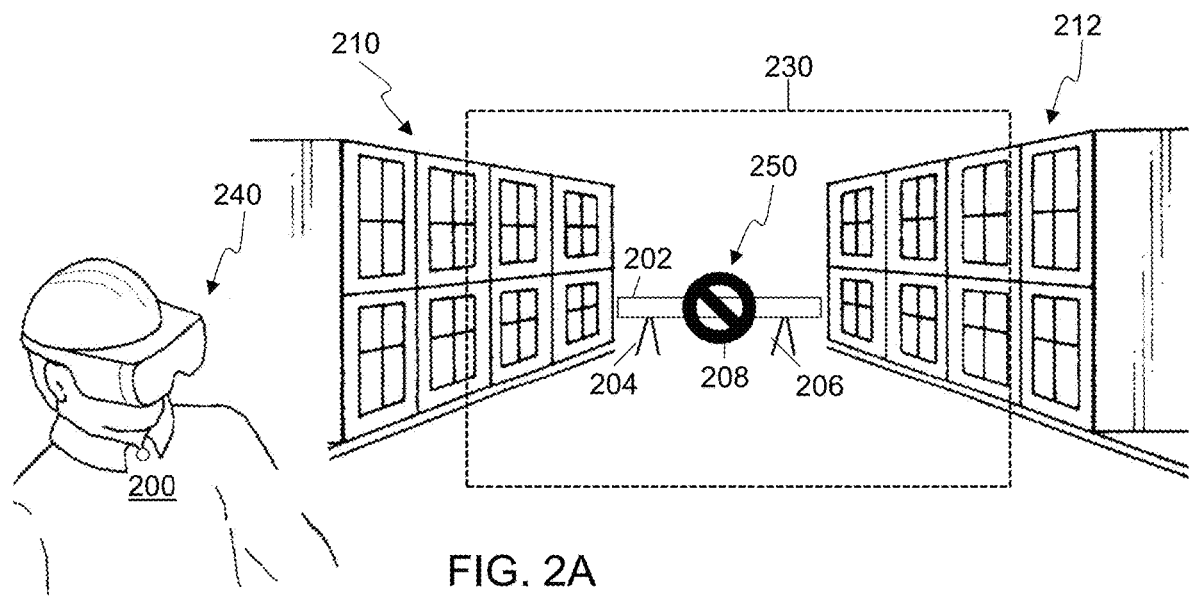
FIG. 2A shows a user wearing an embodiment of a head-mounted display presenting a virtual barrier.

FIG. 2A shows an example embodiment of a HR system rendering a virtual barrier 250 on the display 240 of user 200. The position and orientation of the gap between walls 210, 212 is determined with respect to user 200. The field of view of user 200 is indicated by the dotted box 230; note that box 230 and virtual barrier 250 are not in the real environment. The image of virtual barrier 250 is rendered on the head-mounted display 240 in the correct orientation of the user 200 according to the world-position of the gap between walls 210, 212. The image of the virtual barrier 250 rendered is selected to denote a default stop barrier, comprising a pole 202, stand 204, stand 206, and icon 208.

Figure 2B:
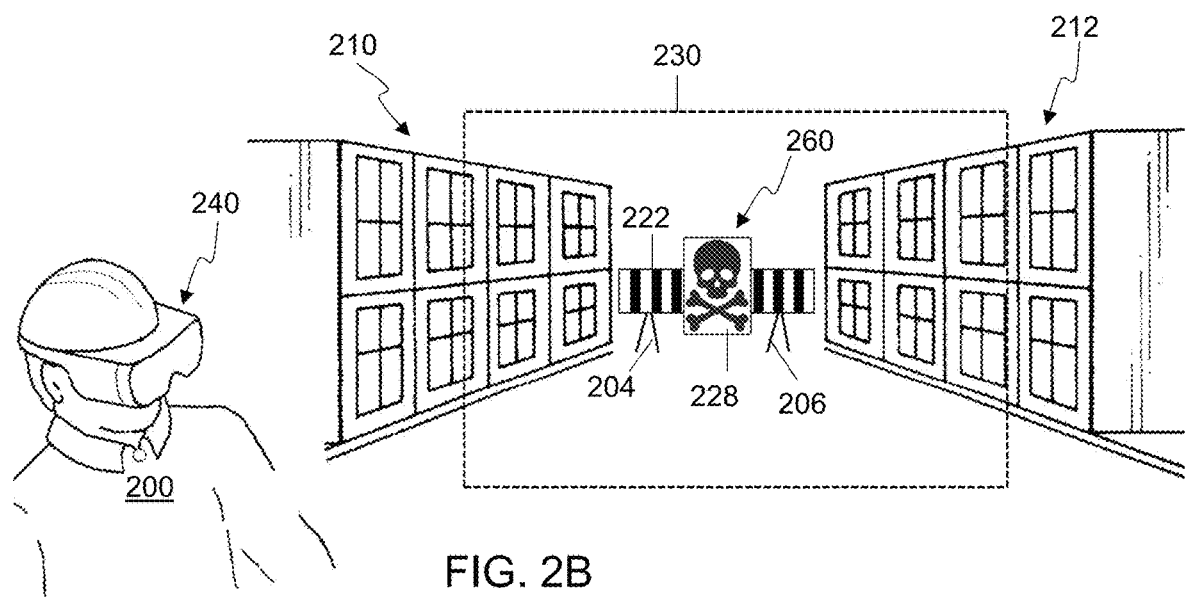
FIG. 2B shows a user wearing the embodiment of a head-mounted display presenting a different state of the virtual barrier.

FIG. 2B shows an example embodiment of a HR system rendering a virtual barrier 260 on the display 240 of user 200. Similar to the vignette shown in FIG. 2A, a virtual barrier 260 is rendered on the head-mounted display 240 in the gap between walls 210, 212 correctly rendered according to the current position and orientation of user 200. At the time of FIG. 2B, the status of the virtual barrier 260 has changed, for example a danger level has increased behind the barrier (e.g. the collapse of a floor behind the world position between walls 210, 212). The change of status causes the HR system to render a different virtual barrier 260 on head-mounted display 240. In FIG. 2B, the virtual barrier appears as a striped wall barrier 222 with hazard symbol 228, indicating that the barrier is less approachable than at the time of FIG. 2A.

Figure 3:
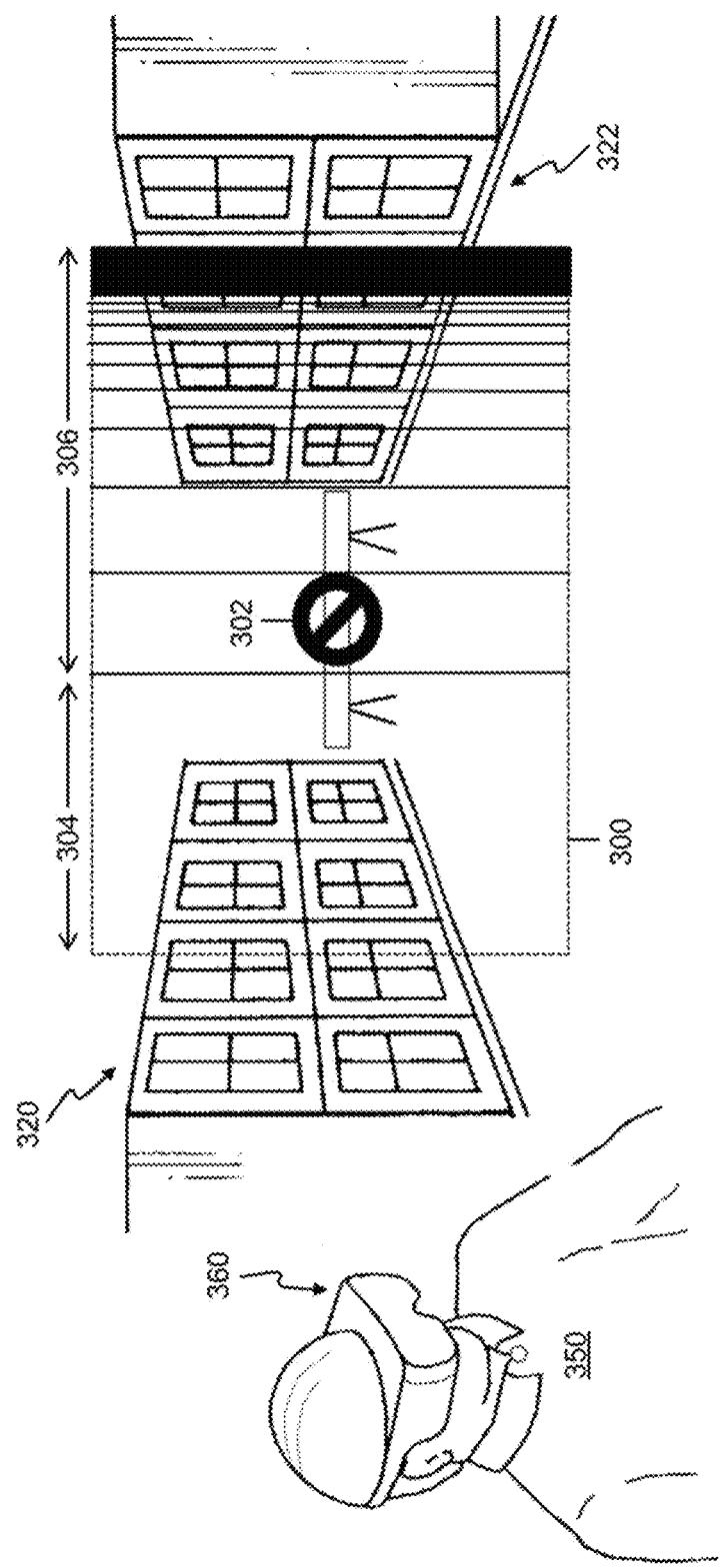
FIG. 3 shows a user wearing an embodiment of a head-mounted display presenting a brightness mask used to direct the user.

FIG. 3 shows an example embodiment of a HR system rendering a brightness gradient within the field of view 300 of head-mounted display 360 worn by user 350. The rendered field of view 300 is superimposed on real world space including walls 320, 322 for clarity. The field of view 300 includes the visible portions of real-world walls 320, 322 and a virtual barrier 302 positioned at the gap. The field of view 300 is split into two regions 304, 306. In region 304, the scene is rendered at a brightness level that may be brighter or the same brightness as before the gradient was applied at the time of FIG. 3. In region 306, a gradual reduction in brightness from left to right is applied, with the right-most edge details almost completely black. The addition of the brightness gradient in regions 304, 306 encourages user 350 to move to the left where objects are more visible; this may be reinforced by making region 304 larger at later times as user 350 turns in the correct direction.

Figure 4A:
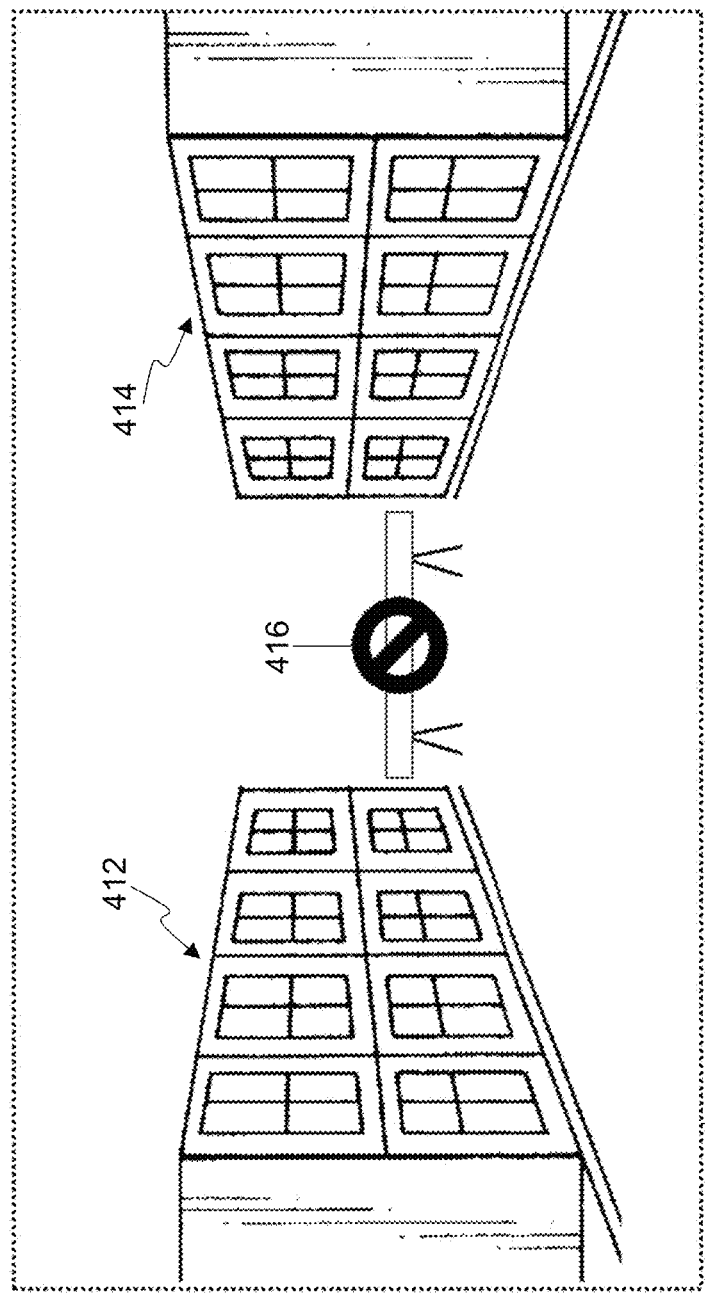
FIG. 4A shows in-view and out-of-view objects near a user wearing an embodiment of a head-mounted display.
Figure 4A:
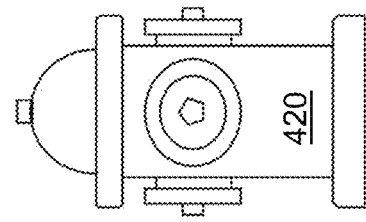

FIG. 4A shows an example snapshot of an embodiment of an HR system display. The field of view 410 is the same size as the display. Within the field of view 410 are two walls 412, 414 and a virtual barrier 416 rendered by the example HR system. In the real world, there is a fire hydrant 420 on the left which is not in the field of view 410.

Figure 4B:
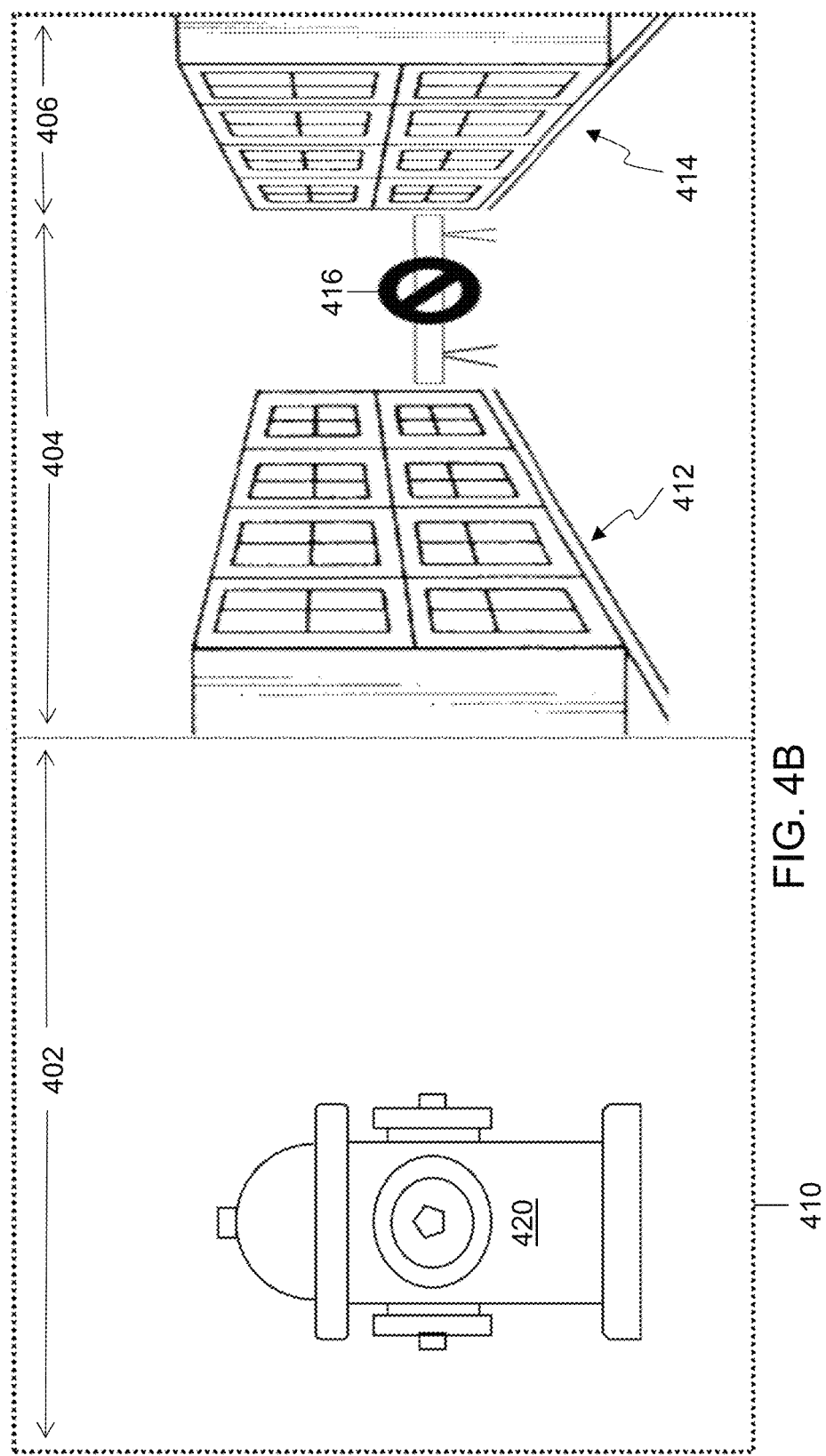
FIG. 4B shows a distortion mask presenting out-of-view data to direct a user wearing an embodiment of a head-mounted display.

FIG. 4B shows an example snapshot of an embodiment of an HR system display showing the same scene as FIG. 4A at a different time. The field of view 410 is split into three regions 402, 404, 406. In region 402, objects previously out of the field of view 410 are rendered, for example fire hydrant 420. Other embodiments may include a different region of the field of view to show objects that are not actually within the field of view of the user, such as a region at the top of the display or a region at the bottom of the display. In some embodiments, eye gaze tracking may be used to determine when a user looks to predefined region of the display, and objects that are out of view may be shown in that region in response to the user looking at that region of the display.

In region 404, the left side of the actual field of view is rendered at an x-compression level defined by the ratios of 402, 404 and 406. In region 406, the right side of the actual field of view is rendered at a higher x-compression level than used in region 404. The addition of the distortion gradient in regions 402, 404, 406 encourages a user to move to the left where objects are not distorted; this may be reinforced by making region 402 larger at later times as the field of view moves in the correct direction.

Figure 5:
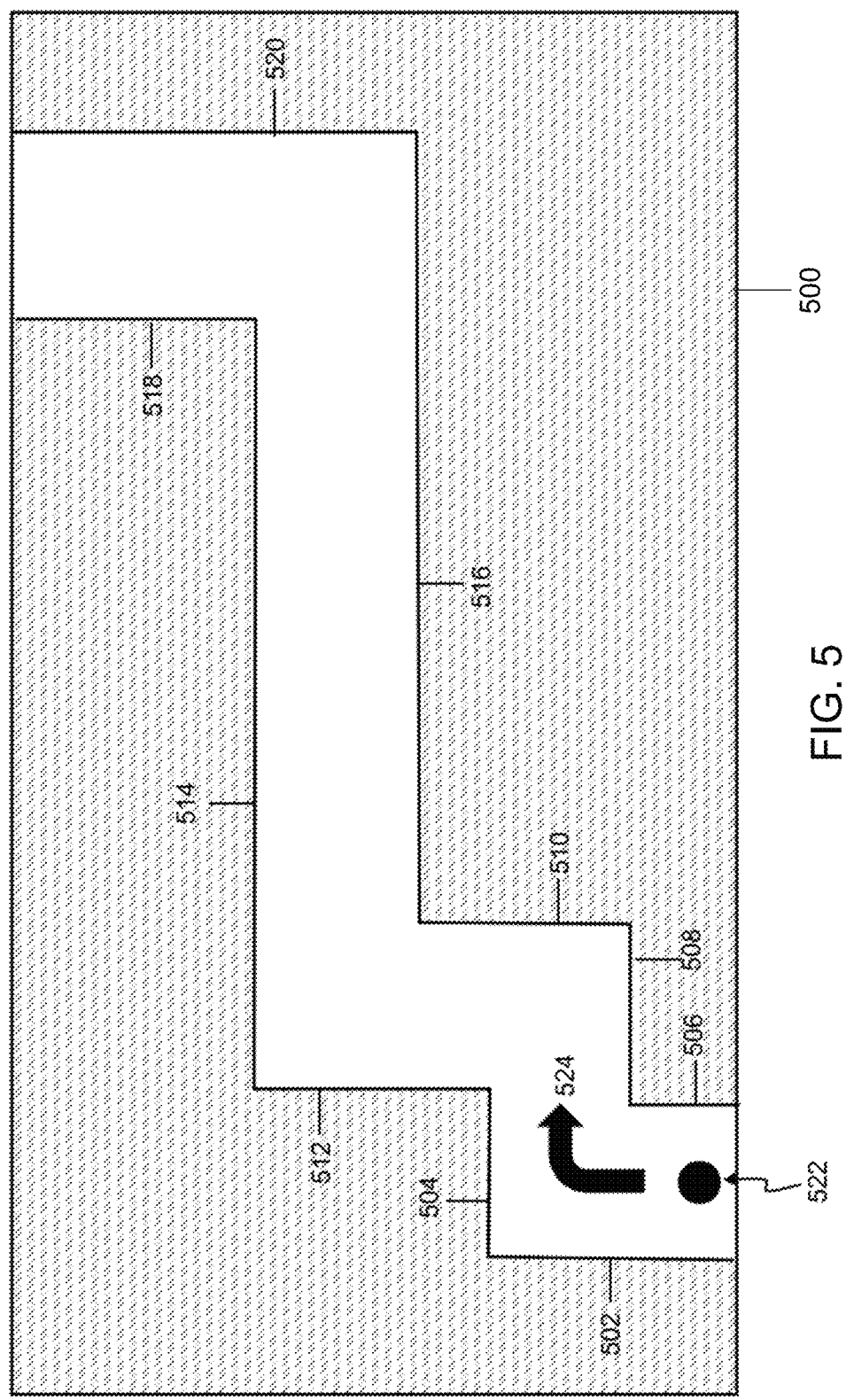
FIG. 5 shows an overhead map of a path presented by an embodiment of a head-mounted display.

FIG. 5 shows an overhead map of a path presented by an embodiment of a head-mounted display. In FIG. 5, the path is defined by the sequence of virtual barriers 502, 504, 512, 514, 518 on the left and by the sequence of virtual barriers 506, 508, 510, 516, 520 on the right. In this embodiment, each virtual barrier is represented as the edge of the path but may be rendered in any manner. The HR system display view 500 is rendered in full-screen as the path from an overhead perspective, but the map may be shown in a window of the display in embodiments. The current position of the user relative to the path is shown by icon 522 which moves as the user moves. The arrow 524 indicates routing instructions, and may be enhanced, for example, using voice commands or text prompts. At the time of FIG. 5, the user is on the path and so the HR system prompts are confined to simple routing instructions; however, if the user starts to stray from the desired path, each virtual barrier 502, 504, 512, 514, 518, 506, 508, 510, 516, 520 may use one or more encroaching stimuli to keep the user on path. Note that the overhead map may show the whole map or a current portion which may scroll or update.

Figure 6A:
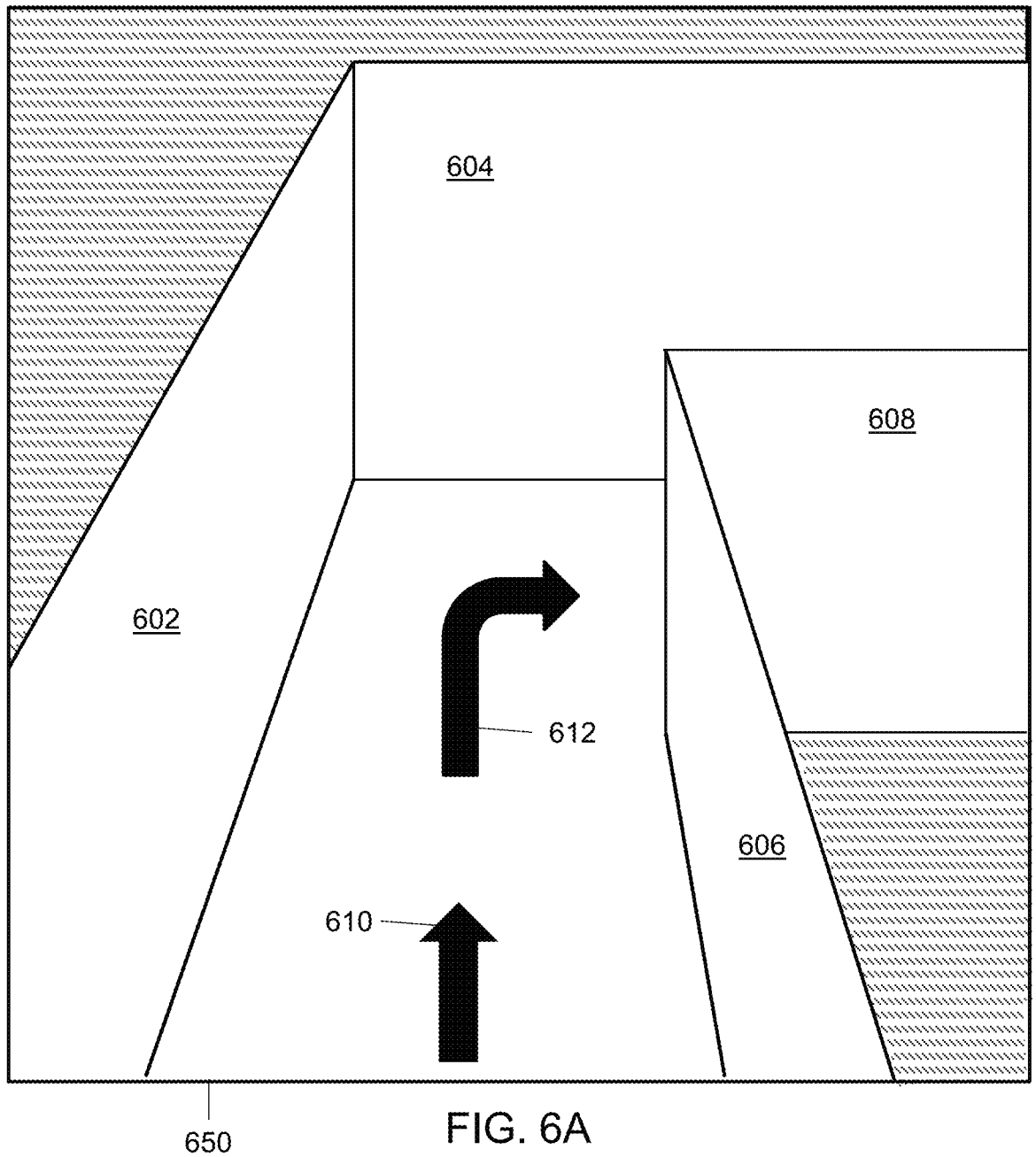
FIG. 6A shows part of a 3D path presented by an embodiment of a head-mounted display.

FIG. 6A shows part of a 3D path presented by an embodiment of a head-mounted display. In FIG. 6A, the current portion of the path facing the user is defined by the sequence of virtual barriers 602, 604 on the left and by the sequence of virtual barriers 606, 608 on the right. In this embodiment, each virtual barrier is represented as a blank wall but may be rendered in any manner. Real-world objects are not shown in FIG. 6A for clarity, but embodiments may include real-world objects overlaid by the virtual barriers. The HR system display view 650 is rendered in full-screen as the portion of the path directly in front of the user, but the map may be shown in a window of the display in some embodiments. The current position of the user relative to the path is indicated by the lower edge of the screen. The arrows 610, 612 indicate routing instructions, and may be enhanced, for example, using voice commands or text prompts. At the time of FIG. 6A, the user is on the path and so the HR system prompts are confined to simple routing instructions; however, if the user starts to stray from the desired path, each virtual barrier 602, 604, 606, 608 may use one or more encroaching stimuli to keep the user on path. As the user moves over time, the display 650 is updated to reflect the current perspective of the user.

Figure 6B:
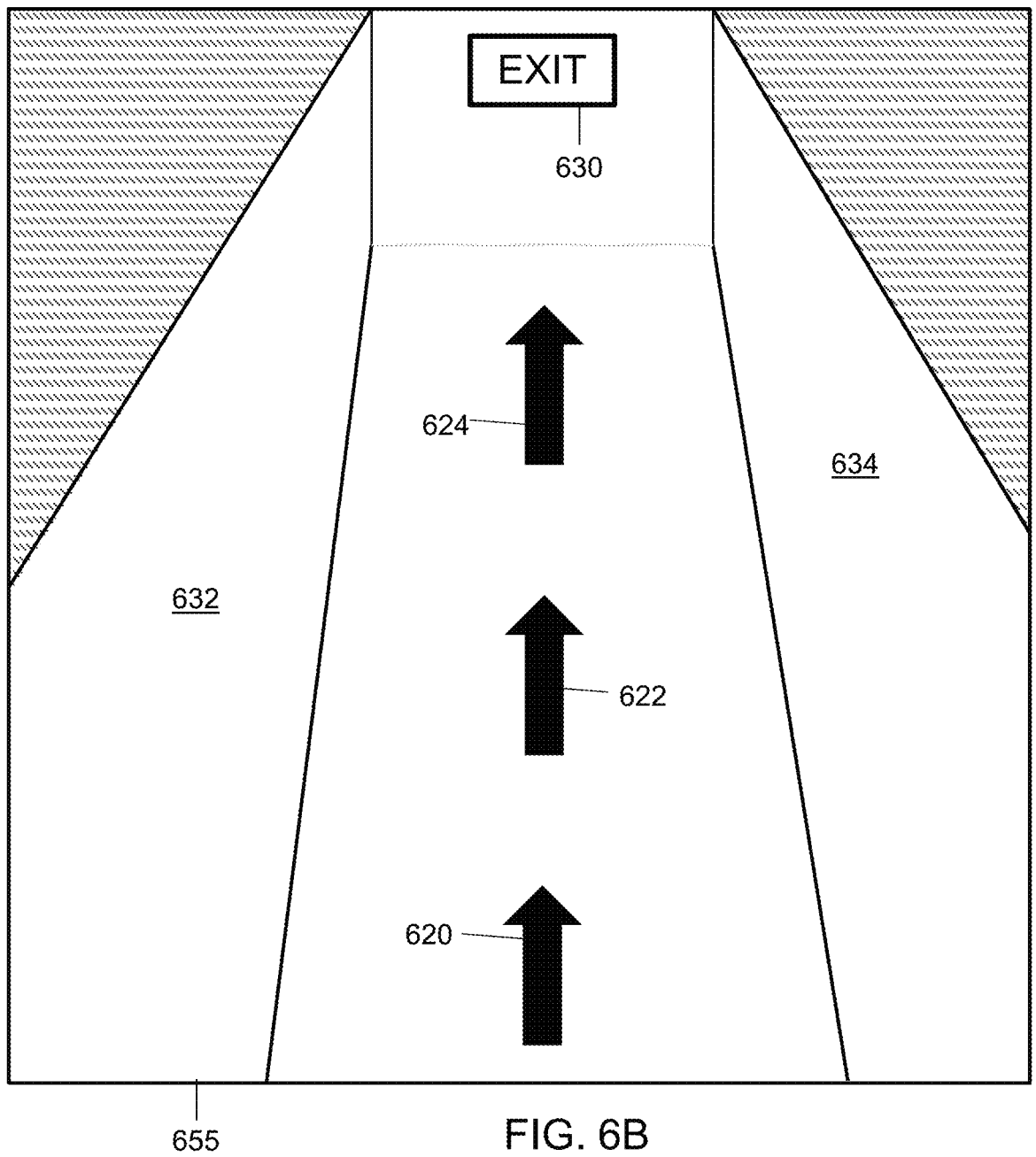
FIG. 6B shows the exit of a 3D path presented by an embodiment of a head-mounted display.

FIG. 6B shows the exit of a 3D path presented by an embodiment of a head-mounted display. In FIG. 6B, the current portion of the path facing the user path is defined by virtual barrier 632 on the left and by virtual barrier 634 on the right. In this embodiment, each virtual barrier is represented as a blank wall but may be rendered in any manner. Real-world objects are not shown in FIG. 6B for clarity, but embodiments may include real-world objects overlaid by the virtual barriers. The HR system display view 655 is rendered in full-screen as the portion of the path directly in front of the user, but the map may be shown in a window of the display. The current position of the user relative to the path is indicated by the lower edge of the screen. The arrows 620, 622, 624 indicate routing instructions to the exit, and may be enhanced, for example, using voice commands or text prompts. At the time of FIG. 6B, the user is on the path and so the HR system prompts are confined to simple routing instructions; however, if the user starts to stray from the desired path, each virtual barrier 632, 634 may use one or more encroaching stimuli to keep the user on path. As the user moves in time, the map is updated to reflect the current perspective of the user. The exit of the path is shown as icon 630 but may be enhanced or replaced with a view of the real-world from the correct perspective.

Figure 7:
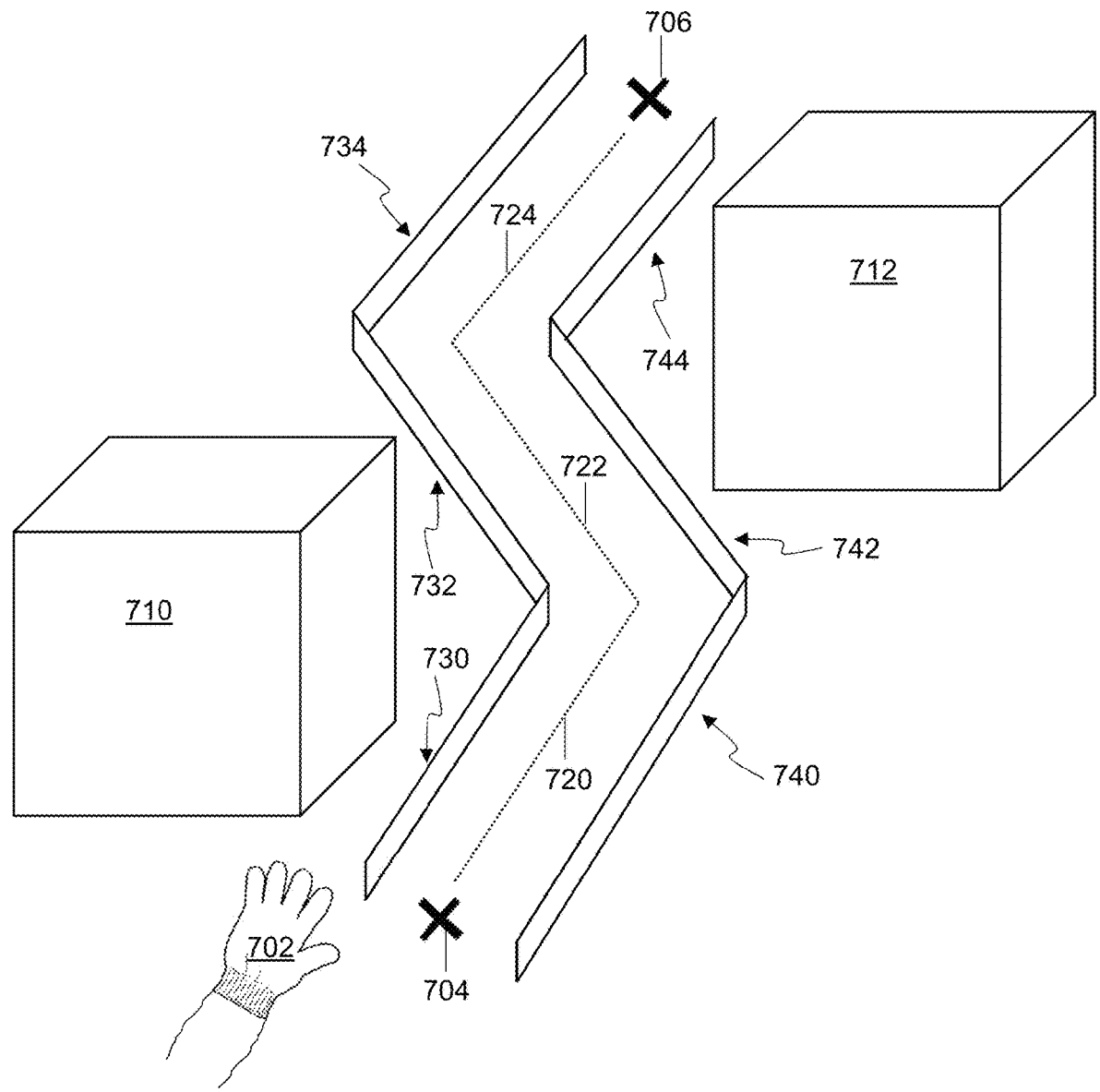
FIG. 7 shows a path for a hand motion presented by an embodiment of a head-mounted display.

FIG. 7 shows a path for a hand motion presented by an embodiment of a head-mounted display. The required path for hand 702 starts at 3D position 704 and ends at 3D position 706 and is blocked by real-world components 710, 712. The real-world interference components 710, 712 may be rendered as artificial objects or shown as real-world objects. The path between 3D locations 704, 706 that the hand 702 is to follow is shown by dotted line segments 720, 722, 724. Note that the dotted line segments 720,722,724 might not be shown on the display but are included in FIG. 7 to show the desired path of the hand 702. A sequence of virtual barriers 730, 732, 734 on the left and a sequence of virtual barriers 740, 742, 744 on the right guard the path are displayed to the user. If the hand motion strays from one of the desired path segments 720, 722, 724, each virtual barrier 730, 732, 734, 740, 742, 744 may use one or more encroaching stimuli to keep the user on path, such as, but not limited to, a haptic stimulus in a glove worn by hand 702. The position of the hand 702 is updated to show the current location in 3D space or is shown as the real-world hand. In some embodiments, the virtual barriers 730, 732, 734, 740, 742, 744 may not be shown on the display to reduce screen clutter.

Figure 8:
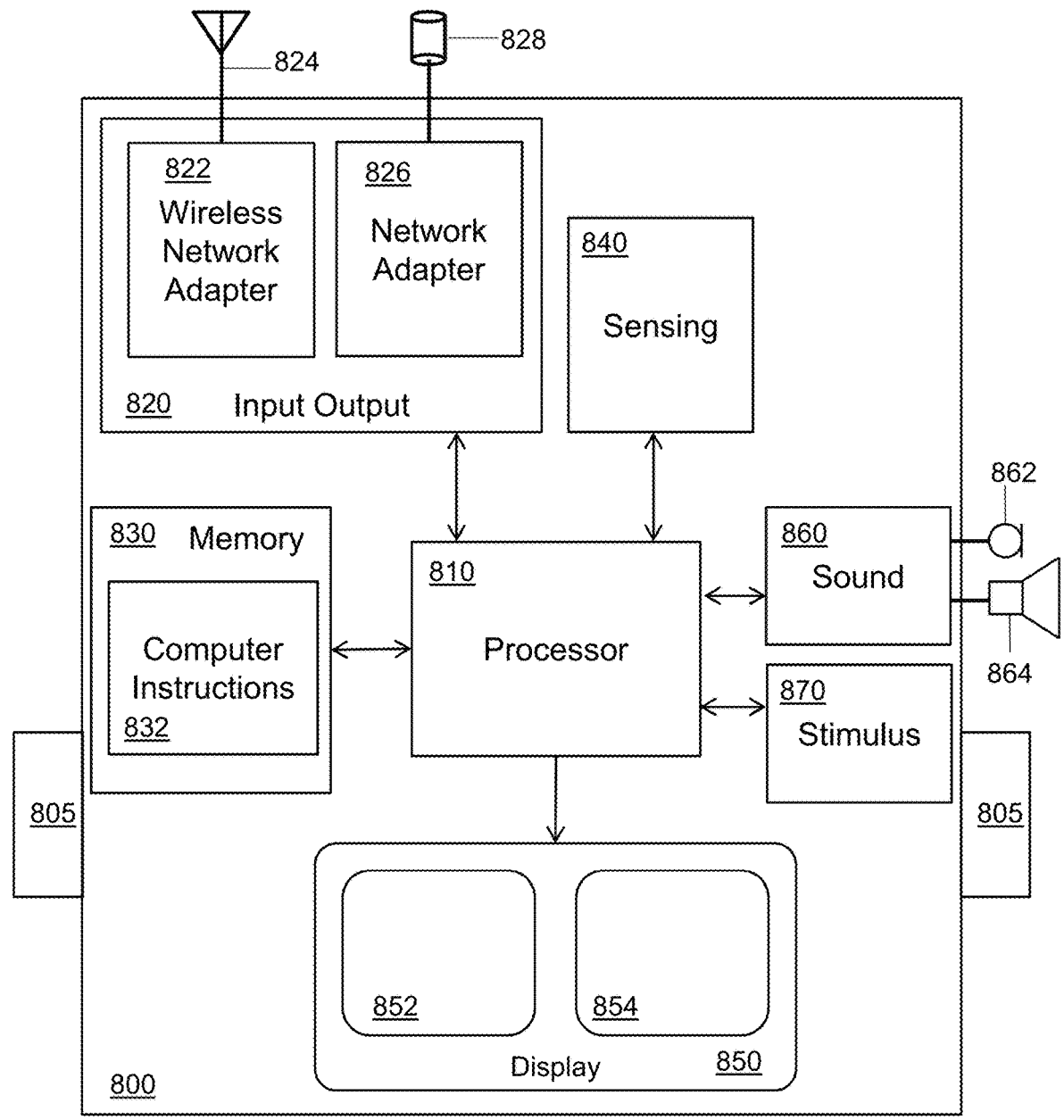
FIG. 8 shows a block diagram of an embodiment of an HR system.

FIG. 8 is a block diagram of an embodiment of an HR system 800 which may have some components implemented as part of a head-mounted assembly. The HR system 800 may be considered a computer system that can be adapted to be worn on the head, carried by hand, or otherwise attached to a user. In the embodiment of the HR system 800 shown, a structure 805 is included which is adapted to be worn on the head of a user. The structure 805 may include straps, a helmet, a hat, or any other type of mechanism to hold the HR system on the head of the user as an HMD.

The HR system 800 also includes a display 850 coupled to position the display 850 in a field-of-view (FOV) of the user. The structure 805 may position the display 850 in a field of view of the user. In some embodiments, the display 850 may be a stereoscopic display with two separate views of the FOV, such as view 852 for the user's left eye, and view 854 for the user's right eye. The two views 852, 854 may be shown as two images on a single display device or may be shown using separate display devices that are included in the display 850. In some embodiments, the display 850 may be transparent, such as in an augmented reality (AR) HMD. In systems where the display 850 is transparent, the view of the FOV of the real-world as seen through the display 850 by the user is composited with virtual objects that are shown on the display 850. The virtual objects may occlude real objects in the FOV as overlay elements and may themselves be transparent or opaque, depending on the technology used for the display 850 and the rendering of the virtual object. A virtual object, such as a virtual barrier, may be positioned in a virtual space, that could be two-dimensional or three-dimensional, depending on the embodiment, and may be anchored to an associated real object in real space. Note that if the display 850 is a stereoscopic display, two different views of the virtual barrier may be rendered and shown in two different relative positions on the two views 852, 854, depending on the disparity as defined by the inter-ocular distance of a viewer.

In some embodiments, the HR system 800 includes one or more sensors in a sensing block 840 to sense at least a portion of the FOV of the user by gathering the appropriate information for that sensor, for example visible light from a visible light camera, from the FOV of the user. Any number of any type of sensor, including sensors described previously herein, may be included in the sensor block 840, depending on the embodiment.

The HR system 800 may also include an I/O block 820 to allow communication with external devices. The I/O block 820 may include one or both of a wireless network adapter 822 coupled to an antenna 824 and a network adapter 826 coupled to a wired connection 828. The wired connection 828 may be plugged into a portable device, for example a mobile phone, or may be a component of an umbilical system such as used in extreme environments.

In some embodiments, the HR system 800 includes a sound processor 860 which takes input from one or microphones 862. In some HR systems 800, the microphones 862 may be attached to the user. External microphones, for example attached to an autonomous drone, may send sound data samples through wireless or wired connections to I/O block 820 instead of, or in addition to, the sound data received from the microphones 862. The sound processor 860 may generate sound data which is transferred to one or more speakers 864, which are a type of sound reproduction device. The generated sound data may be analog samples or digital values. If more than one speaker 864 is used, the sound processor may generate or simulate 2D or 3D sound placement. In some HR systems 800, a first speaker may be positioned to provide sound to the left ear of the user and a second speaker may be positioned to provide sound to the right ear of the user. Together, the first speaker and the second speaker may provide binaural sound to the user.

In some embodiments, the HR system 800 includes a stimulus block 870. The stimulus block 870 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 800 may include a processor 810 and one or more memory devices 830, which may also be referred to as a tangible medium or a computer readable medium. The processor 810 is coupled to the display 850, the sensing block 840, the memory 830, I/O block 820, sound block 860, and stimulus block 870, and is configured to execute the instructions 832 encoded on (i.e. stored in) the memory 830. Thus, the HR system 800 may include an article of manufacture comprising a tangible medium 830, that is not a transitory propagating signal, encoding computer-readable instructions 832 that, when applied to a computer system 800, instruct the computer system 800 to perform one or more methods described herein, thereby configuring the processor 810.

While the processor 810 included in the HR system 800 may be able to perform methods described herein autonomously, in some embodiments, processing facilities outside of that provided by the processor 810 included inside of the HR system 800 may be used to perform one or more elements of methods described herein. In one non-limiting example, the processor 810 may receive information from one or more of the sensors 840 and send that information through the wireless network adapter 822 to an external processor, such as a cloud processing system or an external server. The external processor may then process the sensor information to identify a location for a virtual barrier in the FOV and send the location to the processor 810 through the wireless network adapter 822. The processor 810 may then use the geometry, appearance and location of the virtual barrier in the FOV to render and show the virtual barrier on the display 850.

In some embodiments, the instructions 832 may instruct the HR system 800 to detect one or more objects in a field-of-view (FOV) using at least one sensor 840 coupled to the computer system 800. The instructions 832 may further instruct the HR system 800, using at least one sensor 840, to determine the world position of the one or more objects.

The instructions 832 may further instruct the HR system 800 to establish a world position for a barrier according the world position of the one or more objects detected in the FOV.

The instructions 832 may further instruct the HR system 800 to render an image of a virtual barrier on the display 850 at a position corresponding to the world position of a barrier. In one non-limiting example, the instructions 832 instruct the HR system 800 to render the virtual barrier using images determined by information received by the HR system 800 related to conditions occluded behind the world position of the barrier.

The instructions 832 may further instruct the HR system 800 to render an image of a virtual barrier on the display 850 at a position corresponding to the world position of a barrier at a fixed position over periods of time to correct for motion. In one non-limiting example, the instructions 832 instruct the HR system 800 to render the virtual barrier from different perspectives as the user moves as determined by gyroscopes in the sensor block 840.

The instructions 832 may further instruct the HR system 800 to present an additional sensory stimulus to the user to encourage the user to avoid the world position of the virtual barrier object. In one non-limiting example, the instructions 832 instruct the HR system 800 to determine the distance of the user from the world position of the virtual barrier object using at least one sensor 840. As the distance changes over time, the instructions 832 instruct the HR system 800 to provide one or more stimuli, for example an unnatural sound presented by sound processor 860, a change of appearance of the virtual barrier object on the display 850, a visual flash on the display 850, a sudden loud noise presented by sound processor 860, or a haptic push delivered through the stimulus block 870. The haptic push may be delivered by any mechanism, such as, but not limited to, the HR system 800, a suit worn by the user, or a glove worn by the user.

In some embodiments, the instructions 832 may further instruct the HR system 800 to calculate a direction for the user to move to avoid the world position of the virtual object and to deliver a haptic push in the determined direction to the HR system 800, a suit worn by the user, or a glove worn by the user using the stimulus block 870.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
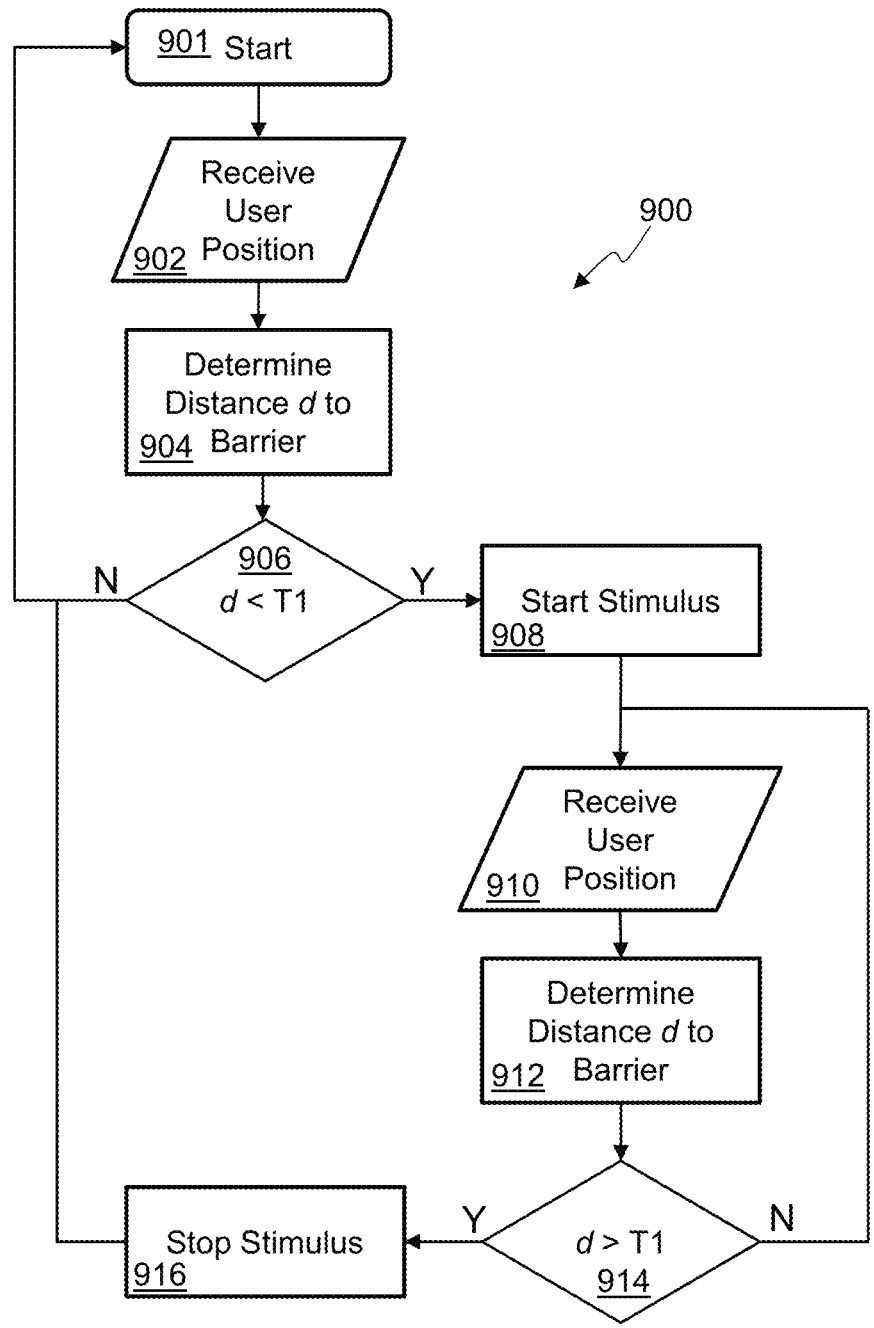
FIG. 9 is a flowchart of an embodiment of a method for directing a user to approach a virtual barrier.

FIG. 9 is a flowchart 900 of an embodiment of a method for directing a user to approach a virtual barrier. The method starts 901 and a user position is received 902 from hardware integrated into a head-mounted display in some embodiments. The user position may be obtained relatively from a known position using depth sensor camera or gyroscopes, using absolute positioning systems such as GPS, or other mechanisms, depending on the embodiment. The flowchart 900 continues by determining 904 a distance 'd' from the known world-position of a virtual barrier, where the distance 'd' is the difference between the user location and the world-position of the virtual barrier. The flowchart 900 continues by comparing 906 'd' to a nearness threshold 'T1'. If the user is not near the virtual barrier, then 'd' is greater than or equal to 'T1' and the flowchart returns to the start 901. If the user is proximal to the virtual barrier, then 'd' is less than 'T1' and the flowchart 900 continues to start a stimulus 908, such as a sound, visual cue or haptic push is some embodiments.

The flowchart 900 continues by receiving 910 a user position and determining 912 a distance 'd' to the virtual barrier at a new time instant. The distance 'd' is compared 914 to 'T1' and if 'd' is less than or equal to 'T1', then the user is still proximal to the barrier, and an update for 'd' 910, 912 is repeatedly determined at subsequent time points. If 'd' is greater than 'T1', then the user has moved away from the barrier and the flowchart 900 continues by stopping the stimulus 916 and then returning to the start 901.

In some embodiments, the threshold T1 may be a fixed value, for example set by default or by the user. In other embodiments, the threshold T1 may be a fixed value determined by system context, for example the type of barrier, the status of a barrier, or the current environment. In yet other embodiments, the threshold T1 may be variable depending on the state of the HR system or on user state.

Figure 10:
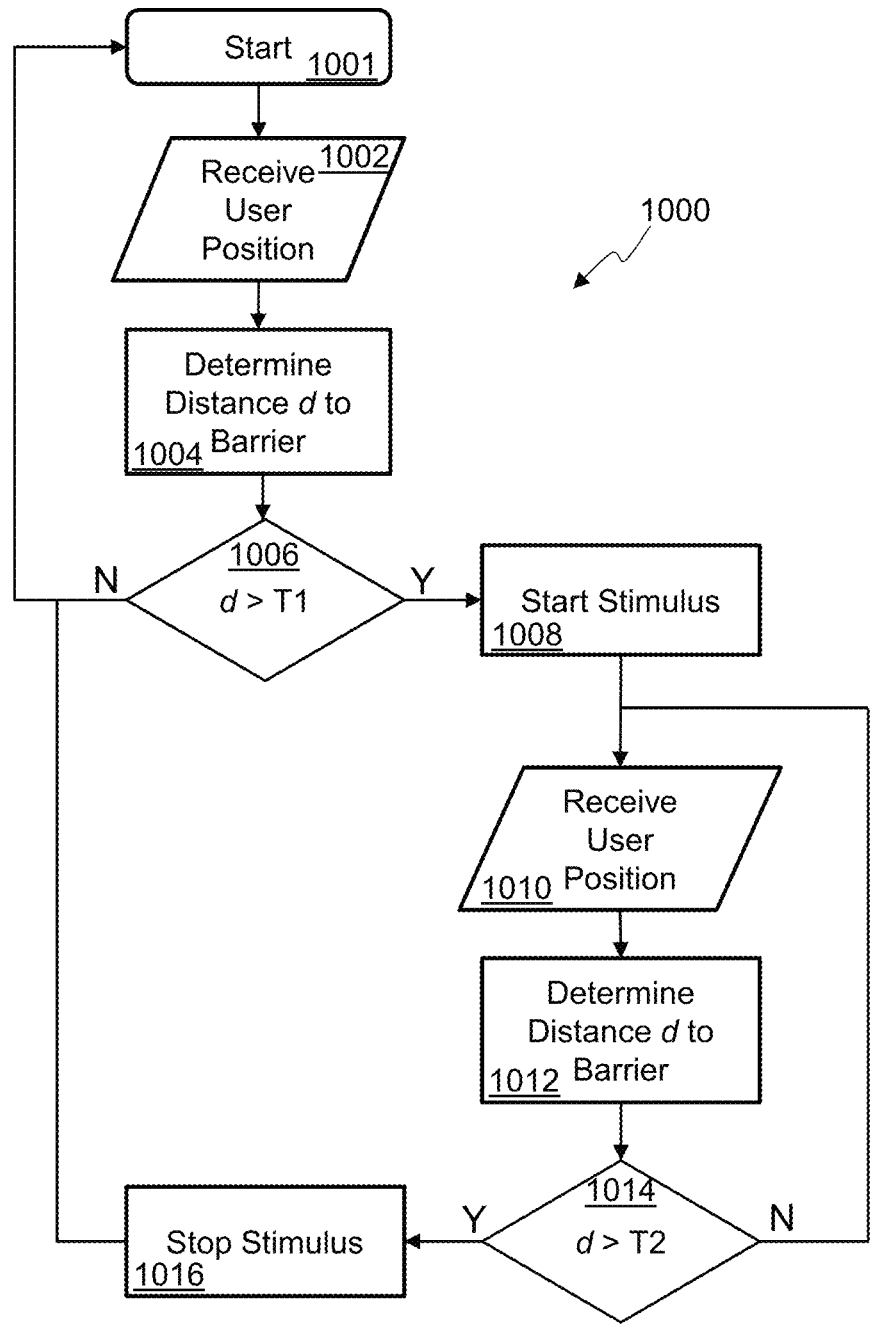
FIG. 10 is a flowchart of an embodiment of a method for directing a user to retreat from a virtual barrier.

FIG. 10 is a flowchart 1000 of an embodiment of a method for directing a user to retreat from a virtual barrier. The method starts 1001 and a user position is received 1002 from hardware integrated into a head-mounted display in some embodiments. The user position may be obtained relatively from a known position using depth sensor camera or gyroscopes, using absolute positioning systems such as GPS, or other mechanisms, depending on the embodiment. The flowchart 1000 continues by determining 1004 a distance 'd' from the known world-position of a virtual barrier, where the distance 'd' is the difference between the user location and the world-position of the virtual barrier. The flowchart 1000 continues by comparing 1006 'd' to a nearness threshold 'T1'. If the user is near the virtual barrier, then 'd' is less than or equal to 'T1' and the flowchart returns to the start 1001. If the user is not proximal to the virtual barrier, then 'd' is greater than 'T1' and the flowchart 1000 continues to start a reassuring stimulus 1008, such as a sound, visual cue or haptic push is some embodiments.

The flowchart 1000 continues by receiving 1010 a user position and determining 1012 a distance 'd' to the virtual barrier at a new time instant. The distance 'd' is compared 1014 to 'T2' and if 'd' is less than or equal to a threshold 'T2', then the user is still proximal to the barrier, and an update for 'd' 1010, 1012 is repeatedly determined at subsequent time points. If 'd' is greater than 'T2', then the user has moved away from the barrier and the flowchart 1000 continues by stopping the stimulus 1016 and then returning to the start 1001.

In some embodiments, the thresholds T1 and T2 may be a fixed value, for example set by default or by the user. In other embodiments, the thresholds T1 and T2 may be a fixed value determined by system context, for example the type of barrier, the status of a barrier, or the current environment. In yet other embodiments, the thresholds T1 and T2 may be variable depending on the state of the HR system or on user state.

In some embodiments, the thresholds T1 and T2 may have the same value. In such embodiments the HR system may require that the stimulus is applied for a minimum time, thus often overriding stopping 1016 the stimulus.

Figure 11:
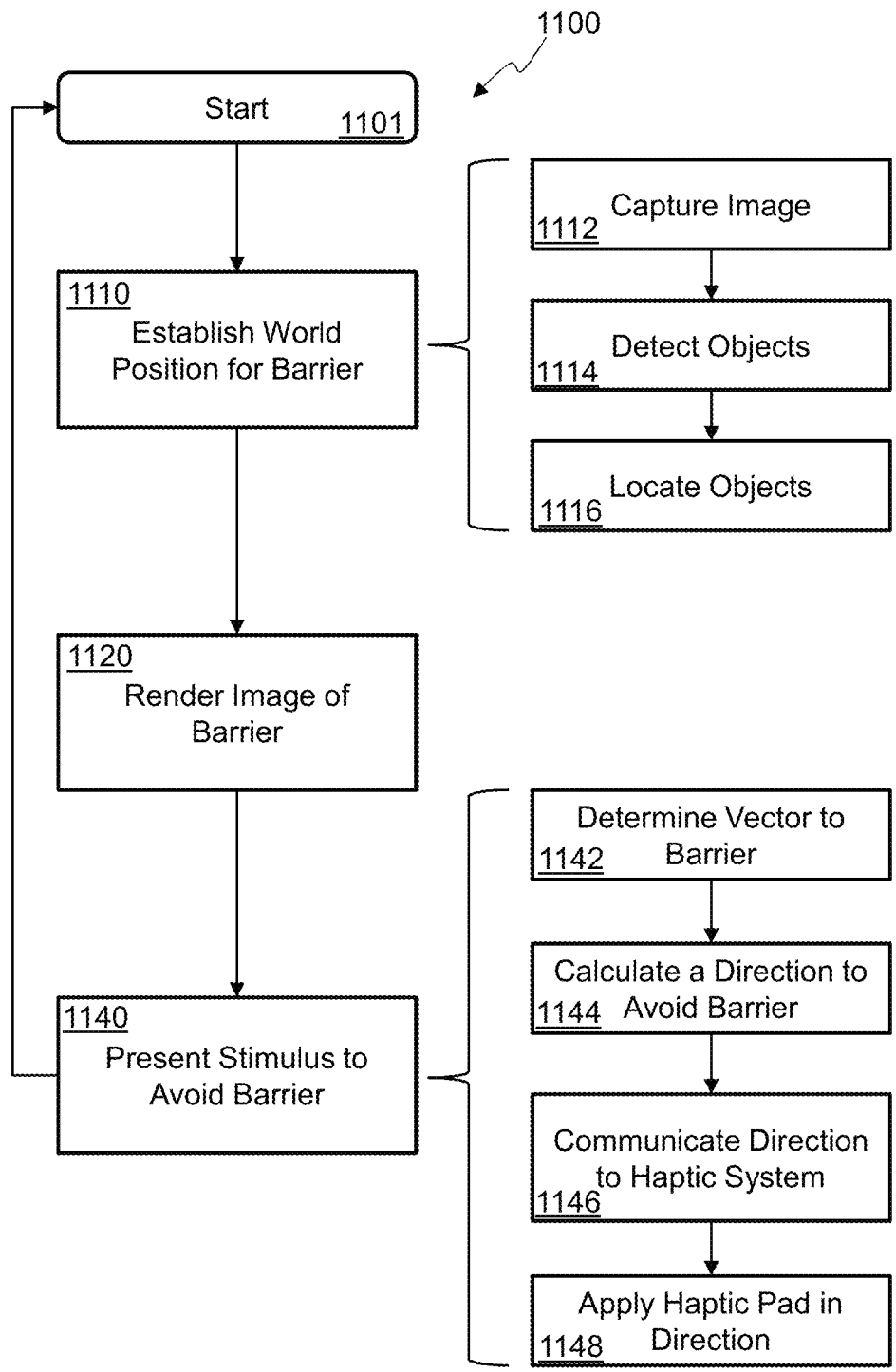
FIG. 11 is a flowchart of an embodiment of a method for providing directional guidance to a user.

FIG. 11 is a flowchart 1100 of an embodiment of a method for providing directional guidance to a user. The method starts 1101 and a world-position is established 1110 for a barrier. The flowchart 1100 continues by rendering 1120 an image of a virtual barrier object at a position corresponding to the world position on a head-mounted display worn by a user. The flowchart 1100 continues by presenting 1140 an additional sensory stimulus to the user to encourage the user to avoid the world position of the virtual barrier object; in some embodiments, the additional sensory stimulus is presented 1140 depending on user proximity to the established world-position of the barrier. The flowchart 1100 then returns to the start 1101.

In some embodiments the world-position is established 1110 by capturing 1112 an image of the field-of-view using a camera coupled to the HR system. Using object recognition, objects in the field of view are detected 1114. The position of the detected objects is computed using depth information from a sensor coupled to the HR system. By using depth and object orientation, the objects can be located 1116 in 3D real-world space. In some embodiments, the virtual barrier is located at a fixed position relative to one or more of the objects in 3d real-world space.

In some embodiments a vector to the virtual barrier may be determined 1142 using the world-position of the virtual barrier and computing the position relative to the current viewpoint of the user. A direction for the user to move to avoid the world position of the virtual barrier is calculated 1144, for example an opposite vector. Information related to the direction may be communicated 1146 to a haptic system coupled to the HR system, for example one or more of a plurality of haptic pads in clothing worn by the user. The additional stimulus may then then applied 1148 by one or more haptic pads to encourage the user in the calculated direction.

Figure 12:
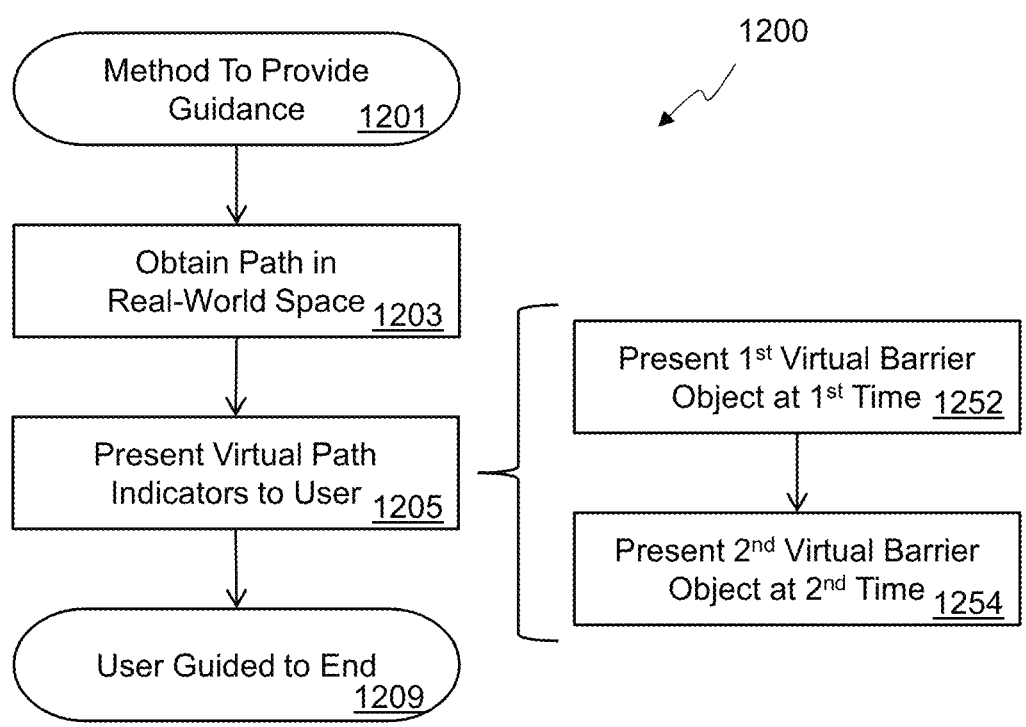
FIG. 12 is a flowchart of an embodiment of a method to provide directional guidance to a user wearing a head-mounted display.

FIG. 12 is a flowchart 1200 of an embodiment of a method to provide directional guidance to a user wearing a head-mounted display. The method starts 1201 and includes obtaining 1203 a path through real-world space. The path can be obtained in any way, including, but not limited to, receiving a path from an external source, detecting locations of real world objects and calculating a path based on those locations, and receiving input from the user to defining the path.

Two or more virtual path indicators are presented 1205 to the user on the HMD. The virtual path indicators may show a path for the user to follow and/or may be virtual barriers indicating a place where the user should not go. The virtual path indicators can be overlaid on a view of a portion of the real-world space, to direct the user to follow the path. In some embodiments, the the plurality of virtual path indicators are displayed as a two-dimensional map of the path, but in other embodiments, the plurality of virtual path indicators are displayed as a path between two points in three dimensions in real-world space. In some cases, a subset of the plurality of virtual path indicators are displayed in correct perspective to the user as a portion of a three-dimensional map.

In some embodiments, the virtual path indicators may be presented sequentially, over time, as the user moves. So the method may include presenting a first virtual path indicator 1252 as a first virtual barrier object at a first location on the HMD based on a first location of the user at a first time, and presenting a second virtual path indicator 1254 as a second virtual barrier object at a second location on the HMD based on second location of the user at a second time. The first virtual barrier object may be positioned at a first fixed position in real-world space, and the second virtual barrier object may be positioned at a second fixed position in real-world space as the user moves. Additional virtual barrier objects may be presented to the user as the user moves to guide the user to an end point of path 1209.

Embodiments may be useful in a variety of applications and in a variety of environments. While use by emergency responders has been described in some detail above, many other fields of endeavor may also use embodiments. Non-limiting examples of environments where embodiments may be used are described below.

One example environment where embodiments may be used is in surgical operation. A surgeon may use an embodiment to prevent scalpel from touching healthy internal organ. For example, the virtual barriers may be situated just outside a cancer tumor to segregate it from remaining part of subject organ. If a scalpel held by a surgeon, or in some cases held by machine controlled by a surgeon, crosses the virtual barriers, a haptic shake may be presented by a glove worn by the surgeon. If the scalpel further goes beyond the cancer in the healthy organ, the stimuli may be changed, for example, the amplitude of the shake may in increased, or an audio alert may be generated. In one embodiment, the haptic shake may be administered to the surgeon's wrist to avoid disturbing subtle finger movements of the surgeon.

Another example environment where embodiments may be used is in a helmet or goggles worn by a rider of a motorcycle or bicycle. For example, other vehicles and/or the shoulder of the road are marked with virtual barriers, and in case the rider gets within a certain distance from virtual barriers, a haptic shake may be added to the helmet or goggles. In another embodiments, the haptic shake may be administered by handlebars of the cycle, and/or autonomous control of the cycle may be used avoid a collision the real-world obstacle marked by the virtual barrier.

Another example environment where embodiments may be used is a helmet worn by a worker in a factory or warehouse. For example, by wearing a helmet with a HMD, the worker can see virtual barriers when she/he is in front of dangerous materials, such as toxic chemicals, highly heated materials or machines, heavy objects, or the like. Stimuli, such as haptic shakes, alerting sound, and unpleasant odors, can also be administered by the helmet or another equipment. Information about the dangerous materials encountered by each worker may be shared with co-workers in a timely manner or synchronized by transmitting data through wireless devices carried by workers.

By wearing the helmet a worker may be able to see virtual path indicators. Virtual path indicators may be generated by (i) identifying a current location using GPS, a cellular connection, a WiFi connection, or any other location detection mechanism and setting a goal location (manually or by using data transmitted from a remote server); (ii) sensing real objects by a sensor or obtaining geographical data from a remote server; (iii) calculating a route which avoids the real objects; and (iv) displaying virtual path indicators in accordance with the calculated route. For instance, a worker may set a location of a particular part in a warehouse as a goal. The HMD worn by the worker may then display a route to that location as a virtual path in the HDM. Virtual barriers may also be shown to the worker in the HMD to keep the worker away from dangerous areas, in addition to showing the virtual path. The route may be calculated based on a shortest distance, a safest path, or any other criteria. A computer embodied in the HMD or a remote server may utilize a map of the factory or warehouse to calculate the path. To ensure more security, the calculated path may maintain a minimum distance from dangerous areas. The route may be calculated by a computer embodied in a remote server monitoring factory's entire system. The HMD may then displays arrows and dotted lines in accordance with the optimum route. The arrows and dotted lines may be changed based on the current location of the worker and the calculated route on a moment-to-moment basis.

Another example environment where embodiments may be used is a helmet worn by a worker in a construction site. For instance, a worker wears a helmet with a HMD which presents virtual barriers to the worker as he/she is about to enter a dangerous or restricted area, such as a soft ground area, an area with a deep hole, an area storing heavy or fragile construction materials, or the like. Stimuli, such as haptic shakes, alerting sound, and unpleasant odors, can also be administered by the helmet or other equipment. A central server may control and provide the information about dangerous or restricted areas to the HMDs of the workers and keep the information updated.

Also, a worker wearing the helmet with HMD may be able to see virtual path indicators. For example, a worker at a construction site may select a location at the construction site as a goal and obtain its location using GPS data or other data obtained from a remote server. The HMD may then generate and/or display virtual barriers by obtaining data of dangerous area from data already stored in the helmet or data obtained from a remote server, such as locations of a soft ground area, an open pit, or a high traffic area. A computer embodied in the HMD or a remote server, having a map of the construction site, may then calculate a route toward the goal location. This may be done by searching for a shortest distance path, a safest path, a path that avoids the virtual barriers, or using any other criteria to compute the route. The route may be a two-dimensional route using paths on the ground, or may be a three-dimensional route that includes paths at different levels, such as different floors in a building. For enhanced safety, the route may be calculated to maintain a minimum distance from virtual barriers. After the route is calculated, the HMD may then display arrows and dotted lines as a virtual path display of the route.

Another example environment where embodiments may be used is piloting an airplane. When a pilot wears a helmet with HMD, she/he can receive guidance from the helmet. Real obstacles and/or hazardous locations may be overlaid or highlighted by virtual barriers which visually support the pilot. These virtual barriers may be generated based on GPS data and map information. The pilot may also receive stimuli, such as haptic shakes, alerting sounds, or unpleasant odors, to reinforce the danger and the virtual barriers are approached.

Another example environment where embodiments may be used is a diving mask worn by a diver. A diver may be presented with virtual barriers by a HMD integrated into the diving mask when she/he faces dangerous creatures or is about to enter a restricted area in the water. At the same time, she/he may receive haptic shakes or an alerting sound from the mask or a diving suit.

By wearing the diving mask with HMD, the diver may also be able to see virtual path indicators. A diver may set a desired destination as a goal and the location of the diver calculated using GPS (if at the surface), using geographical data, or by using other location determination techniques. The location of the goal is also determined and a path calculated to that goal which may then be shown on the HMD as a virtual path display to guide the diver to the goal location. Because GPS signals may not be available underwater, internal navigation techniques may be used to determine the current location of the diver as they follow the instructions of the virtual path. In some embodiments, virtual barriers may also be shown to the diver, in conjunction with the virtual path, to keep the diver away from danger. The HMD may have safe places stored in its memory, or safe places may be obtained from a remote server. If the diver encounters an emergency situation, this may be indicated to the HMD, a safe place may be selected and a virtual path to that safe place shown to the diver on the HMD to guide them to the safe place.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method to provide directional guidance to a user wearing a head-mounted display (HMD), the method comprising:
    establishing a three-dimensional (3D) real-world position for a virtual barrier object, the virtual barrier object not in a real-world environment around the user;
    rendering an image of the virtual barrier object at a position corresponding to the 3D real-world position on the HMD; and
    presenting an additional sensory stimulus, directed to the user's sense of sound, touch, smell, or taste, in addition to the rendered image of the virtual barrier object, to the user to encourage the user to avoid the 3D real-world position of the virtual barrier object.

2. The method of claim 1, further comprising:
    capturing an image of a portion of the real-world around the user with a camera mounted on the HMD; and
    displaying, to the user on the HMD, the rendered image of the virtual barrier object overlaid on the captured image of the portion of the real-world around the user.

3. The method of claim 1, further comprising:
    creating a synthetic image of a portion of the real-world around the user based on data about the real-world around the user; and
    displaying, to the user on the HMD, the rendered image of the virtual barrier object overlaid on the synthetic image of the portion of the real-world around the user.

4. The method of claim 3, further comprising by rendering images of one or more real-world objects identified in the data about the real-world around the user to create the synthetic image.

5. The method of claim 1, further comprising:
    transmitting a view of a portion of the real-world around the user through a transparent portion of the HMD; and
    displaying the rendered image of the virtual barrier object to occlude a portion of the view of the portion of the real-world around the user.

6. The method of claim 1, further comprising:
    determining a distance between the user and the 3D real-world position of the virtual object; and
    selecting the additional sensory stimulus based on the distance.

7. The method of claim 1, further comprising:
    determining a closing velocity between the user and the 3D real-world position of the virtual object; and
    selecting the additional sensory stimulus based on the closing velocity.

8. The method of claim 1, wherein the additional sensory stimulus comprises a haptic push delivered by a haptic subsystem of the HMD.

9. The method of claim 1, further comprising:
    calculating a direction for the user to move to avoid the 3D real-world position of the virtual object; and
    communicating information related to the direction to an article of haptic clothing worn by the user;
    wherein the additional sensory stimulus comprises a haptic push applied by the article of haptic clothing worn by the user to encourage the user to move in the direction to avoid the 3D real-world position of the virtual object.

10. The method of claim 1, wherein the additional sensory stimulus encourages the user to move in a specific direction.

11. The method of claim 10, wherein the additional sensory stimulus comprises an unnatural sound presented to the user as originating in the specific direction.

12. The method of claim 1, wherein the 3D real-world position of the virtual barrier object corresponds to a gap between two real-world objects.

13. The method of claim 12, wherein the virtual barrier object is rendered in a correct orientation of the user according to a 3D real-world position of the two real-world objects.

14. An article of manufacture comprising a tangible medium, that is not a transitory propagating signal, encoding computer-readable instructions that, when applied to a computer system, instruct the computer system to perform a method comprising:
    establishing a three-dimensional (3D) real-world position for a virtual barrier object, the virtual barrier object not in a real-world environment around the user;
    rendering an image of the virtual barrier object at a position corresponding to the 3D real-world position on the HMD; and
    presenting an additional sensory stimulus, directed to the user's sense of sound, touch, smell, or taste, in addition to the rendered image of the virtual barrier object, to the user to encourage the user to avoid the 3D real-world position of the virtual barrier object.

15. A head-mounted display (HMD) comprising:
    a display;
    a structure, coupled to the display and adapted to position the display in a field-of-view (FOV) of the user;
    a processor, coupled to the display, the processor configured to:
    establish a three-dimensional (3D) real-world position for a virtual barrier object, the virtual barrier object not in a real-world environment around the user;
    render an image of the virtual barrier object at a position corresponding to the 3D real-world position on the HMD; and
    present an additional sensory stimulus, directed to the user's sense of sound, touch, smell, or taste, in addition to the rendered image of the virtual barrier object, to the user to encourage the user to avoid the 3D real-world position of the virtual barrier object.

* * * * *